(12) United States Patent
Hall

(10) Patent No.: US 7,540,536 B2
(45) Date of Patent: Jun. 2, 2009

(54) SEAT BELT ANCHOR DEVICE AND METHOD

(75) Inventor: Christopher D. Hall, Algonac, MI (US)

(73) Assignee: Takata Seat Belts, Inc., Auburn Hills, MI (US)

(*) Notice: Subject to any disclaimer, the term of this patent is extended or adjusted under 35 U.S.C. 154(b) by 424 days.

(21) Appl. No.: 11/298,393

(22) Filed: Dec. 8, 2005

(65) Prior Publication Data

US 2007/0132224 A1    Jun. 14, 2007

(51) Int. Cl.
*B60R 22/00* (2006.01)
*B60R 22/18* (2006.01)

(52) U.S. Cl. ............... 280/801.1; 297/463.1; 297/468; 297/482

(58) Field of Classification Search ............... 297/468, 297/482, 463.1; 280/801.1
See application file for complete search history.

(56) References Cited

U.S. PATENT DOCUMENTS

| | | | |
|---|---|---|---|
| 3,239,988 A | 3/1966 | Meyer | |
| 3,288,192 A | 11/1966 | Bollinger | |
| 3,437,349 A | 4/1969 | Feles et al. | |
| 4,334,701 A | 6/1982 | Takada | |
| 4,470,716 A | 9/1984 | Welch | |
| 4,550,933 A | 11/1985 | Patterson | |
| 4,577,888 A | 3/1986 | Takada | |
| 4,702,491 A * | 10/1987 | Meyer | 280/801.1 |
| 4,986,570 A | 1/1991 | Quinting | |
| 5,167,428 A | 12/1992 | Garret et al. | |
| 5,186,495 A | 2/1993 | Boumarafi et al. | |
| 5,215,332 A | 6/1993 | De Sloovere | |
| 5,427,412 A | 6/1995 | Staniszewski | |
| 5,669,118 A | 9/1997 | Frano et al. | |
| 6,142,435 A | 11/2000 | Lodi | |
| 6,540,251 B1 | 4/2003 | LeVey et al. | |
| 6,702,327 B2 | 3/2004 | Janz | |

FOREIGN PATENT DOCUMENTS

| | | |
|---|---|---|
| DE | 19958745 C1 | 6/2001 |
| DE | 10131859 | 11/2002 |
| GB | 1 216 657 | 12/1970 |
| GB | 1 347 678 | 2/1974 |
| JP | 60088640 | 5/1985 |
| WO | WO 01/42063 A1 | 6/2001 |

* cited by examiner

*Primary Examiner*—Eric Culbreth
*Assistant Examiner*—Barry Gooden, Jr.
(74) *Attorney, Agent, or Firm*—Fitch, Even, Tabin & Flannery

(57) ABSTRACT

A seat belt anchor device and method are provided for anchoring a seat belt to a stud. The device includes a plate member having a keyhole opening into which the stud is fit with the plate member pulled upwardly to bring the stud to the installed position relative to the plate member. A spring retainer member keeps the stud and plate member in their installed position. A stop is provided to limit pivoting of the spring retainer member relative to the plate member. In some forms, the spring retainer includes resilient clamping portions for clamping engagement with the stud head therebetween in the installed portion.

11 Claims, 12 Drawing Sheets

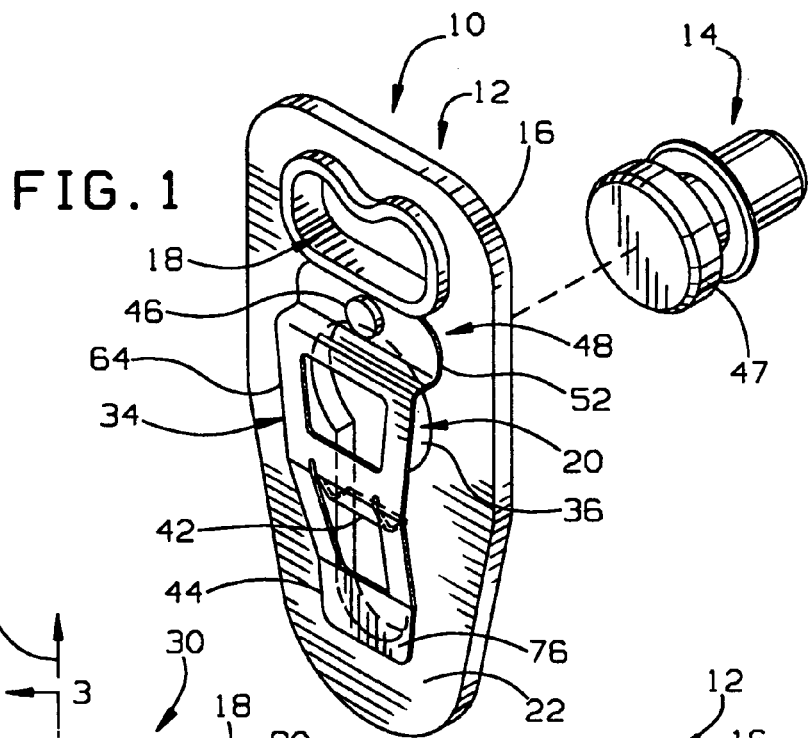
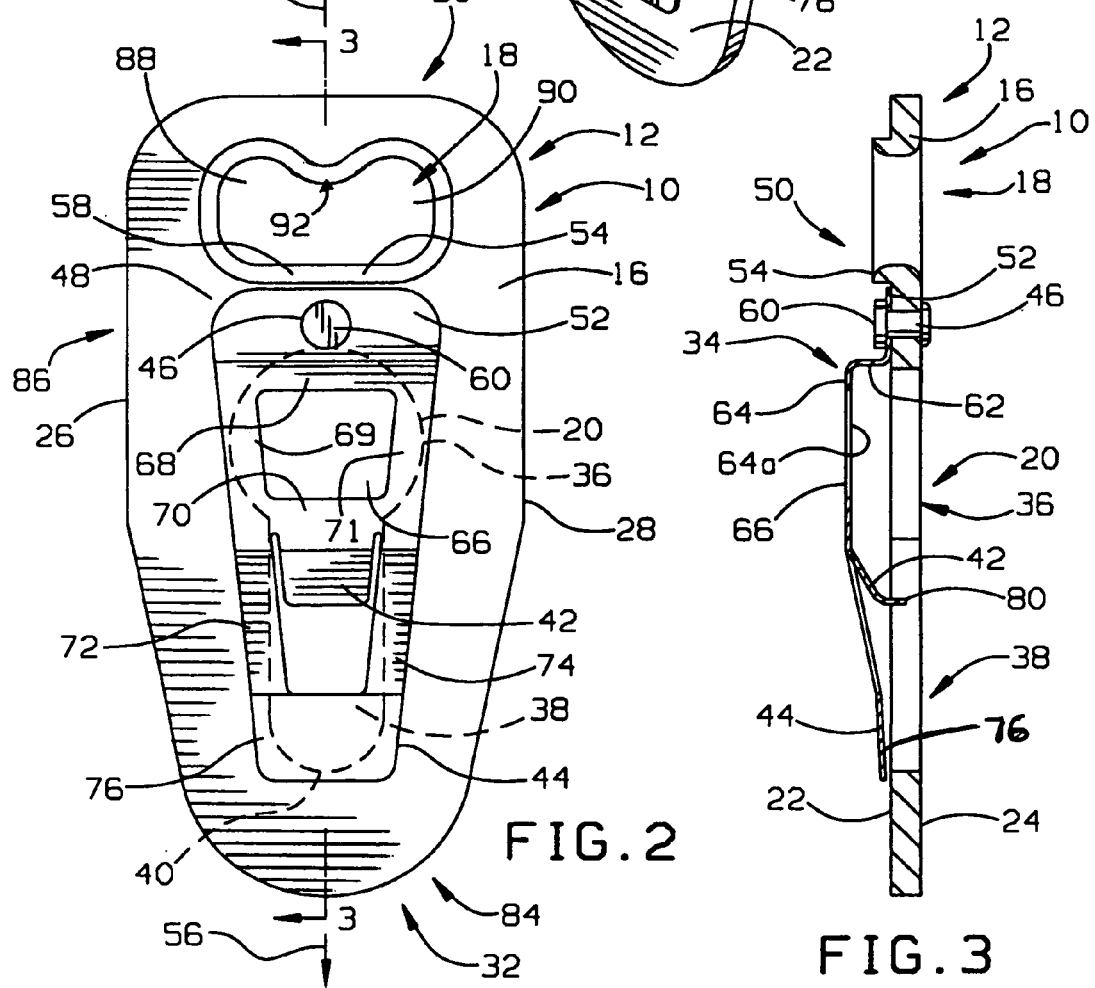
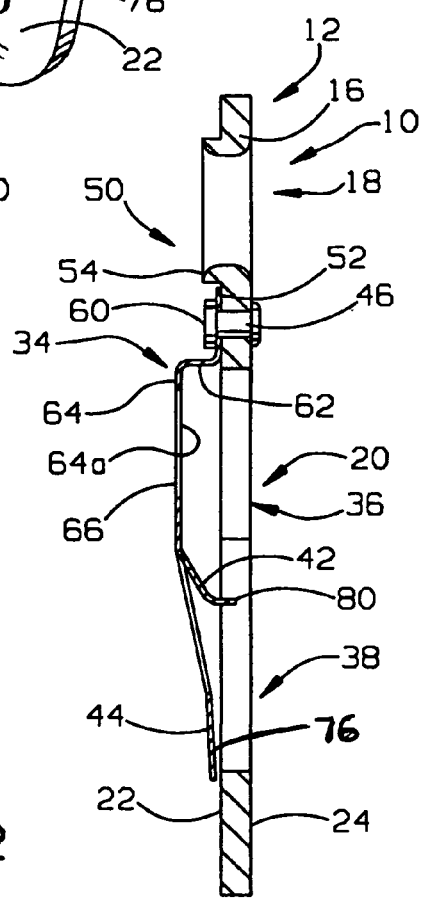
FIG. 1
FIG. 2
FIG. 3

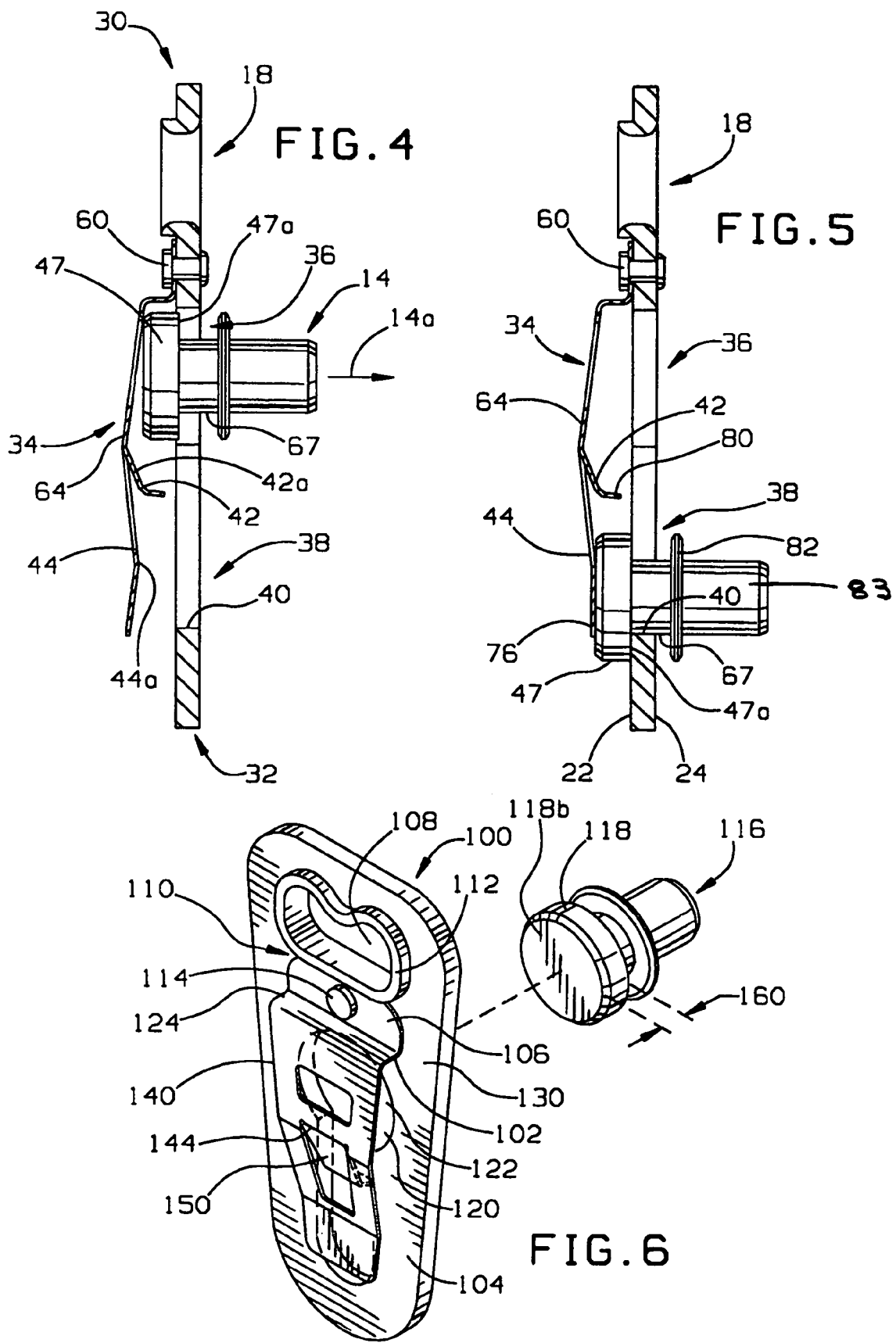

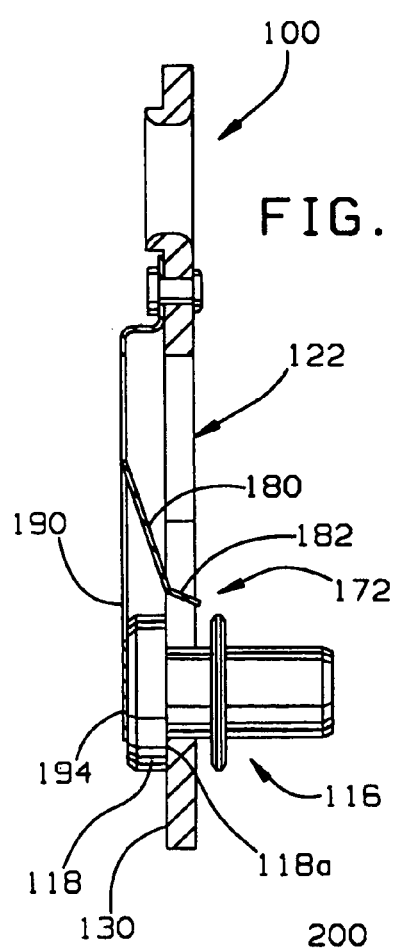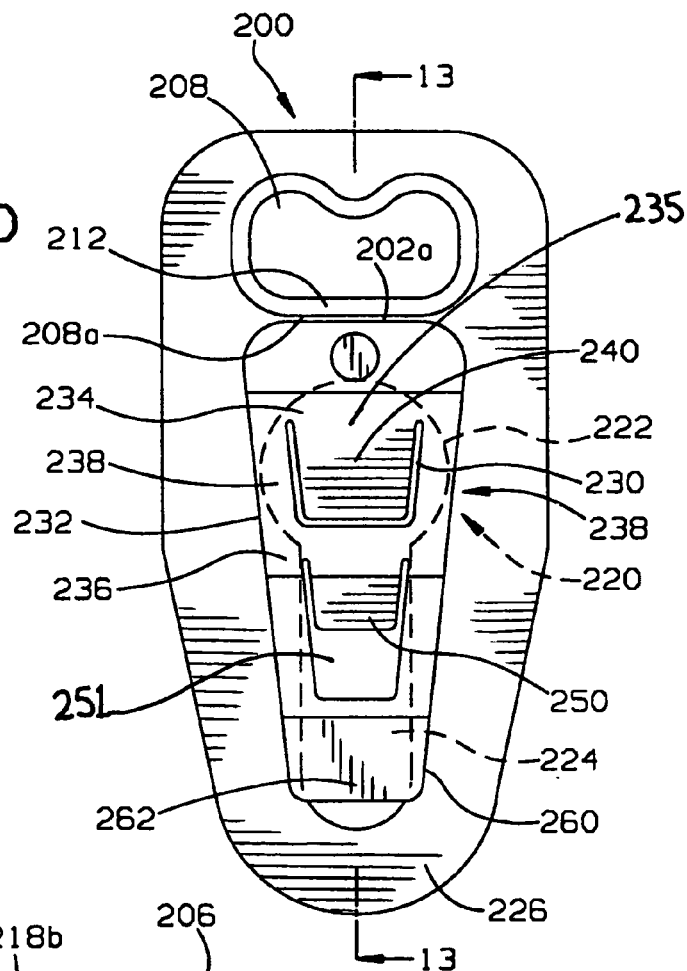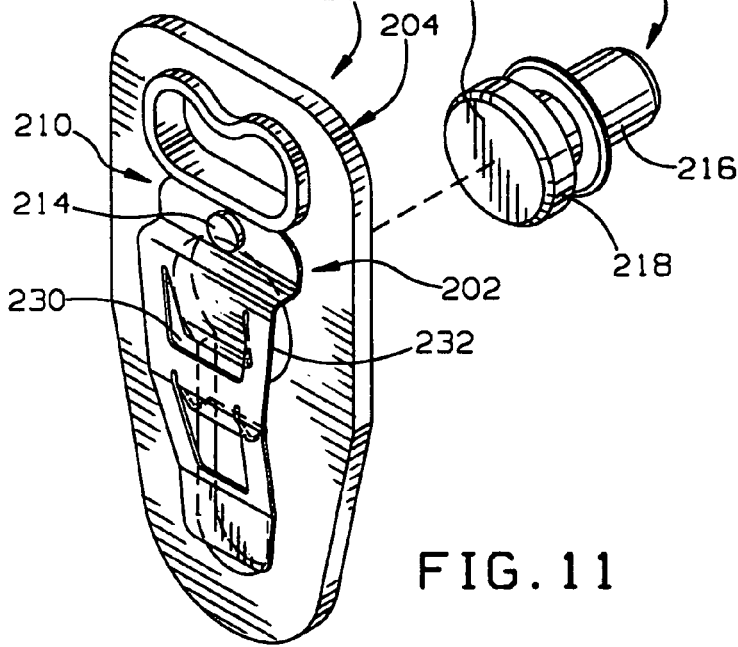

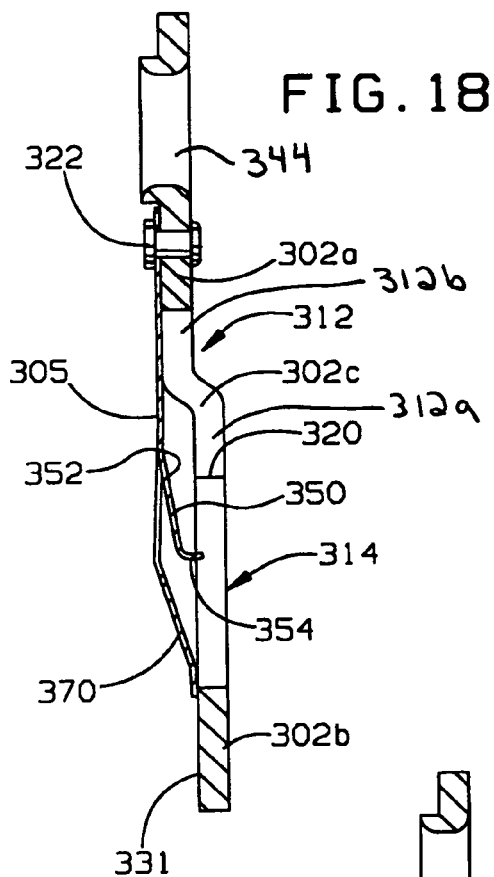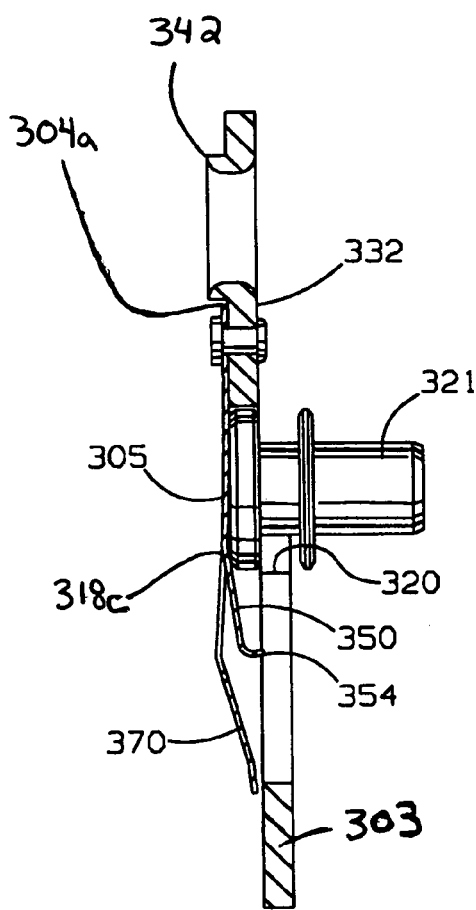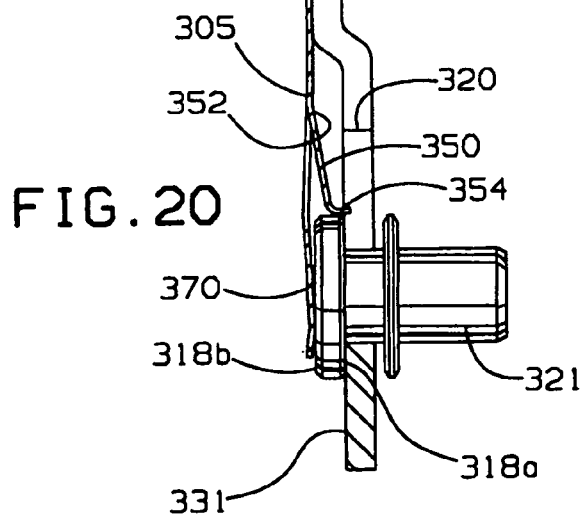
FIG. 18
FIG. 19
FIG. 20

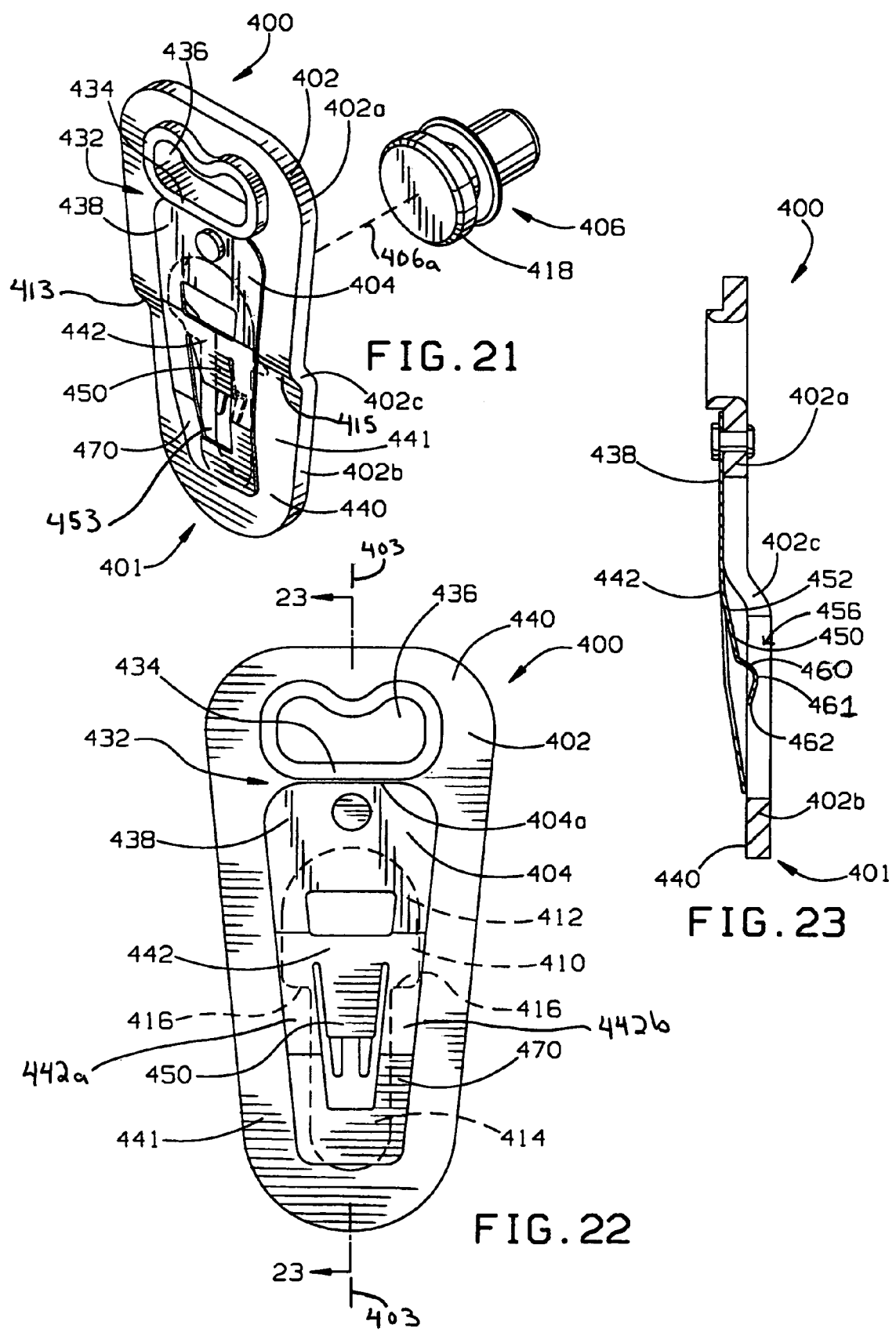

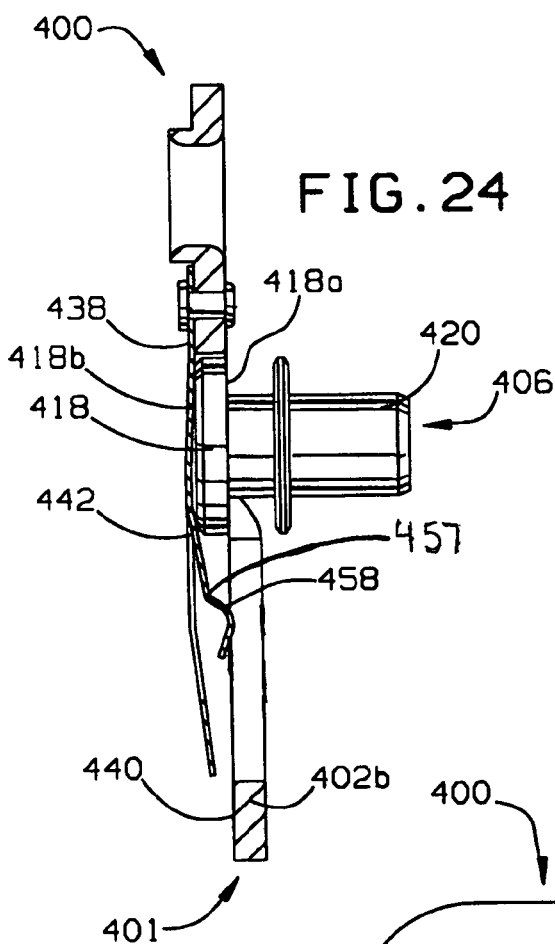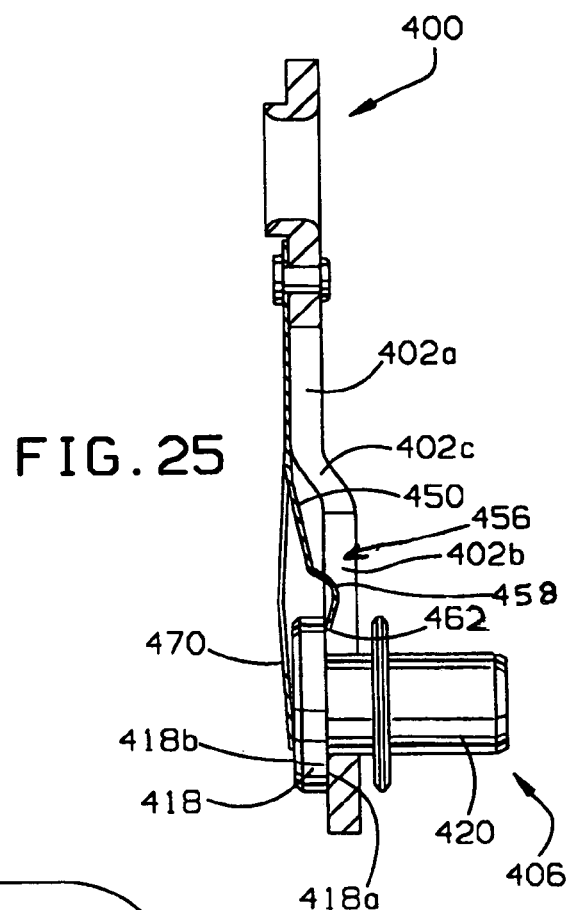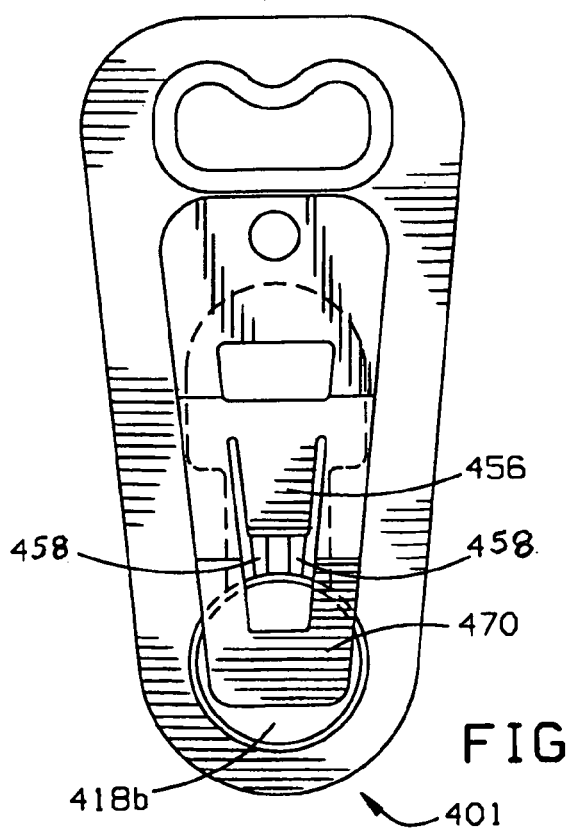

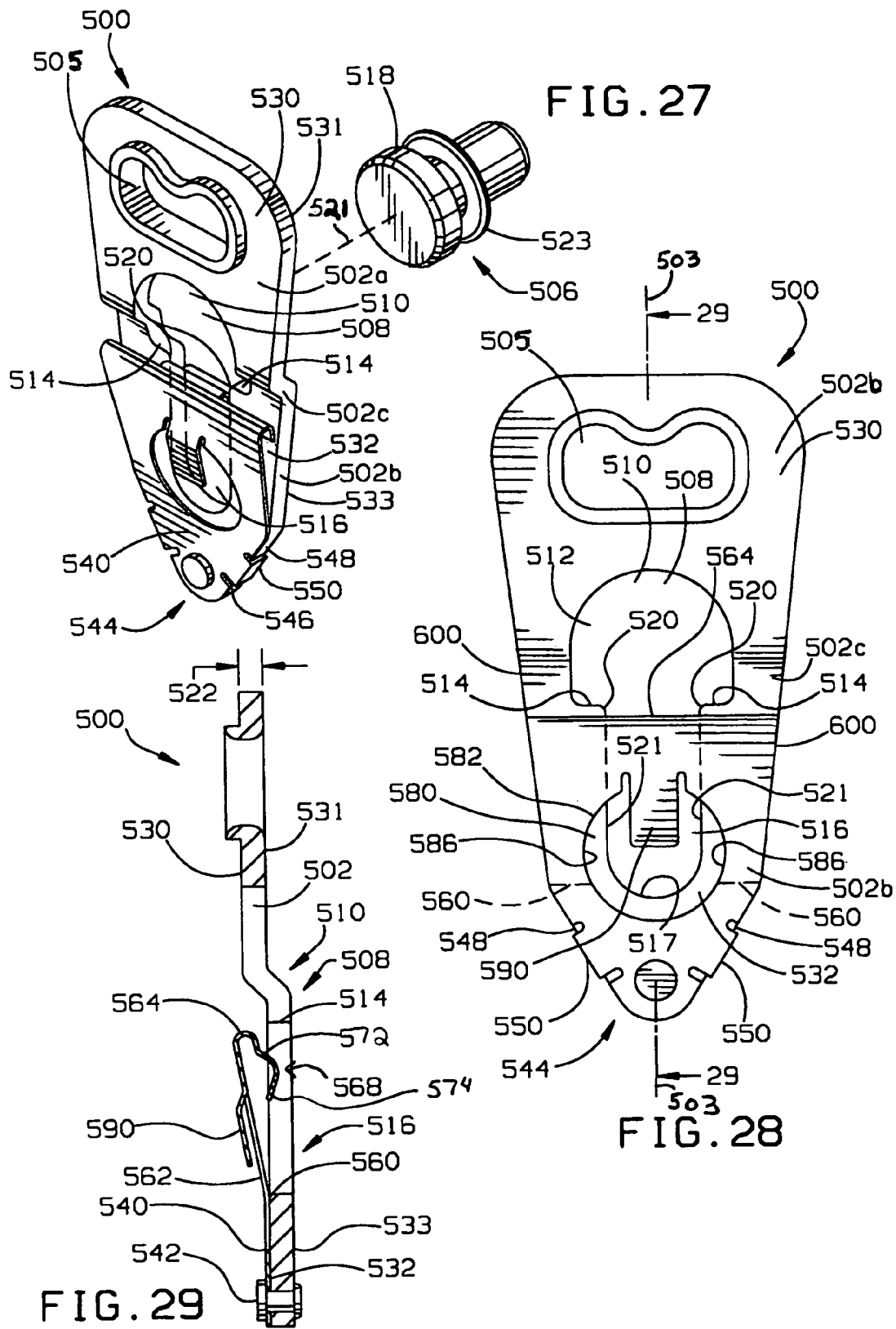

SEAT BELT ANCHOR DEVICE AND METHOD

FIELD OF THE INVENTION

The invention is to a seat belt anchor device and method and, more particularly to seat belt anchor device of the type utilizing a keyhole opening for anchoring a seat belt to a stud.

BACKGROUND OF THE INVENTION

In seat belt systems for vehicles, it is often desirable to be able to anchor the seat belt at one of its anchor points to a stud that is fixed to the seat frame near the floor of the vehicle. In some instances, seat belt systems may be installed after the vehicle seats are finished or partially finished, so that it is difficult to give a clear view of the anchor stud. For example, the anchor may have to be fit through an opening or gap between the plastic trim of the seat and the seat frame member to which the stud is affixed. It may also be the case that the anchor has to be fit between a small opening formed in the upholstery for being lowered down to the lower stud via a fishing installation tool and then connected to the stud.

One such device for this purpose is disclosed in PCT Publication, WO 01/42063A1 ('063 publication). In the '063 publication, a keyhole opening is formed in a plate member adjacent to a seat belt opening. The stud head is fit through the enlarged portion of the keyhole opening and then slid down toward the opposite end of the narrow, slot portion of the keyhole opening. A spring retainer connected to the plate member is operable to keep the member fixed in an installed position with the stud head at the distal end of the slot portion of the keyhole opening.

However, the '063 anchor device has several shortcomings. One problem lies in the manner in which the spring retainer is secured to the plate member. The retainer is secured by two distinct rivets spaced across the enlarged portion of the keyhole opening so that the device disclosed in the '063 publication has four distinct components including the plate member, the spring retainer member, and each of the two rivets. In addition to increasing part costs, there are two separate riveting operations that need be performed to attach the spring retainer to the plate member thus increasing assembly time and cost accordingly.

In addition, during the fitting of the stud head through the keyhole opening, it can be difficult for the installer to be able to know when the stud head has been properly aligned with the keyhole opening for this procedure. This is because the portion of the spring retainer extending above the enlarged portion of the keyhole opening is spaced from the plate member by a distance greater than the thickness of the stud head so that the retainer provides no resistance to moving of the stud head through this enlarged opening portion. Further, because of this spacing once the stud head engages the spring retainer, the installer typically will then want to carefully reposition the stud head closer to the plate for moving the stud to the installed position. Without repositioning the plate so that the stud head is closer thereto, upward pulling on the plate will generate large forces resisting this movement by the spring retainer and the retainer arms thereof making installation more difficult than is desired.

Other problems include space constraints that may be present during installation that can make it difficult to properly align the plate member and stud for fitting the stud head through the key hole opening. Further, after installation, it is desirable for the anchor device to stay securely mounted to the stud during vehicle impacts that generate transverse separation forces between the stud head and spring retainer, such as certain vehicle side impacts may generate.

SUMMARY OF THE INVENTION

In accordance with the invention, a seat belt anchor device and method of installing a seat belt anchor device are provided. The seat belt anchor device includes a plate member formed with a keyhole opening which receives a stud with the plate member then being shifted to an installed position relative to the stud. A spring retainer is connected at an end portion thereof to the plate member and extends in overlying relation to the keyhole opening serving to maintain the plate body and stud in the installed position. Stop structure is provided that limits pivoting of the retainer to maintain it in its overlying relation to the keyhole opening. One advantage provided by the stop structure is that it allows a single fastener, e.g. rivet, to be utilized to secure the end portion of the spring retainer to the plate body which keeps assembly time to a minimum by avoiding a second riveting operation for securing the spring retainer to the plate member. Further, the stop structure can be formed integrally with the plate member body so that the number of parts and costs associated therewith for the anchor device are also kept to a minimum.

More particularly, the stop structure is provided adjacent the spring retainer end portion to limit pivoting thereof. In one form, the stop is a flange that extends about a seat belt opening sized to receive a seat belt extending therethrough. As previously mentioned, the stop permits a single fastener to be utilized to connect the spring retainer end portion to the plate body. In a preferred form, the single fastener is a rivet and the stop is integrally formed with the plate body as a flange raised therefrom so that there are only three distinct components of the anchor device including the plate member, the spring retainer and the rivet.

In another form, the spring retainer has an indicator portion that extends over the keyhole opening enlarged portion spaced by a predetermined amount from the plate body which is less than a thickness of the stud head. In this manner, when the plate body is shifted to move the stud head through the keyhole opening enlarged portion and before being fully inserted therethrough, the stud head will engage the indicator portion of the spring retainer to provide the installer with an early tactile indication that the plate body and stud are properly aligned for installation. In one form, the indicator portion extends generally parallel to the plate body. Preferably, the indicator portion includes a window opening formed therein to minimize resistance to the continued axial movement of the stud head through the keyhole opening enlarged portion.

In another aspect, a method for installing a seat belt anchor to a stud is provided. The method includes providing a plate body having a spring retainer which extends over a keyhole opening of the plate body and is secured to the plate body at a single location, and restricting pivoting of the spring retainer during installation by a raised stop of the plate body.

In one form, pivoting of the spring retainer is restricted by riveting an end portion of the spring retainer to the plate body and engaging the spring retainer end portion with a flange stop formed integrally with the plate body to limit pivoting of the spring retainer.

In another form, the method further includes detecting the fitting of an enlarged head of the stud through an enlarged portion of the keyhole opening with a portion of the spring retainer extending thereover.

In accordance with another aspect, the indicator portion is in the form of a bent spring arm portion that is inwardly canted or angled towards the plate member, and more specifically toward the keyhole opening formed in the body thereof. In this manner, when the plate member is shifted so that the stud head is moved into the keyhole enlarged opening portion, the stud head will engage the indicator portion before being fully inserted therethrough, thus providing an installer with an early tactile indication of receipt and alignment therein. The indicator portion preferably extends inwardly from the edge of a window formed in the spring retainer. The indicator portion may be resiliently deflectable so that receipt of the stud deflects the indicator portion toward the window. The indicator arm portion can also serve as a retainer portion that limits back out of the stud from in its installed position with the anchor device.

In another aspect, a method for installing the anchor device is provided wherein the plate member is shifted so that the stud head is inserted into the keyhole opening to deflect the indicator portion toward and, in one form, into the window. The anchor device and stud may then be shifted relative to each other to cam the indicator portion outwardly away from the plate body. As the indicator portion is pulled past the stud head, the indicator portion then resiliently returns to an interference position to the side of the stud head.

In another form, the plate member can include an indicator arm portion along with a second arm portion that are both canted or angled obliquely inward toward the plate member. The stud head may deflect both arm portions and, once the arm portions are shifted past the stud head, the stud head is retained with the anchor device by the second arm portion. The second arm portion may be resiliently deflectable, and serves as a retainer portion by returning to an interference position to the side of the stud head along the slot portion once the stud head is in an installed position. To this end, the first, indicator arm portion is preferably disposed over the enlarged portion of the keyhole opening, and the second retainer arm portion is preferably disposed over the narrow slot portion of the keyhole opening.

In accordance with a further aspect, the keyhole opening may be formed in a plate body having first and second body portions that are disposed in generally offset planes. The offset plate portions are joined by a transition portion, and the keyhole opening may overlap with the transition portion. The spring retainer can have the connected upper end portion extending flush against the plate body along the first or upper body portion over at least a portion of the enlarged portion of the keyhole opening. The second or lower offset portion of the plate body jogs away from the spring retainer member via the plate body transition portion at the lower end portion of the large portion of the keyhole opening. The spring retainer extends over the lowered or offset remainder of the large portion of the keyhole opening and the narrow slot portion of the keyhole opening and includes an arm portion bent toward the plate body. The bent arm portion has a raised portion of the arm that extends over the large portion of the keyhole opening, and the lower end portion extends toward the narrow slot opening portion of the keyhole opening. In this manner, the arm portion is both an indicator portion and a retainer portion of the spring.

The offset body portions of the plate member are advantageous during installation. By having the connected upper end portion of the spring retainer flush on the upper body portion of the plate member, the spring retainer presents less of an obstacle or potential catch site for the anchor device during installation. As mentioned, the spring retainer arm serves as an indicator for providing the installer with tactile feedback as to the axial position of the plate member and stud head relative to each other.

In a further form similar to the offset plate body form described above, the spring retainer may have an arm portion that extends toward the plate body for cooperating with the underside of the stud head. The arm portion is cammed outwardly away from the plate body as the anchor device is shifted relative to the stud head to install the device on the stud. Once the plate member, and specifically the arm portion thereof, has been shifted sufficiently relative to the stud head so as to be clear thereof, the arm resiliently returns to an interference position to the side of the stud head along the slot portion of the keyhole opening. When in the interference position, an upturned prong or prongs at the end of the arm portion are positioned adjacent or against a bottom or underside surface of the stud head to restrict relative motion between the stud and the anchor device during certain impacts with the vehicle.

More particularly, the end prong or prongs cooperate with a distal arm portion of the spring retainer to exert a generally axially directed force in opposing directions on the stud at the head thereof. In this manner, impacts aligned with the stud axis, such as side impacts, are less likely to cause separation between the stud head and spring retainer that may otherwise be sufficient to allow the plate to shift longitudinally relative to the stud head potentially compromising retention of the anchor device on the stud.

In a preferred form of the present invention where an indicator portion of the spring retainer is not desired, an anchor device is provided with a plate member and a spring retainer that is connected at an end portion thereof to the plate member. Similar to the initially described anchor device, stop structure is provided that allows a single fastener, e.g., rivet, to be utilized to secure to the spring retainer to the plate member. In this form, the stop structure is integral with the spring retainer at the end portion thereof and preferably includes tabs that extend at the side edges of the plate member transverse to the length and width of the plate body. In other words, the tab portions extend in a direction generally parallel with the axis of the mounting stud so that the tab portions engage along the thickness of the plate body to limit or stop pivoting of the spring retainer about the single fastener therefor.

In this form, the spring retainer is preferably arranged so that it only overlies the narrow slot portion of the keyhole opening. Rather than using an end of a retainer arm portion, the spring retainer has an opening that is fit over the stud head when the plate member is shifted longitudinally during installation. The spring retainer is configured so that it snaps onto the stud head with the trailing portion of the edge of the opening in position adjacent the stud head to keep the stud from backing out from the end of the narrow slot portion of the keyhole opening in the installed position of the anchor device on the stud.

BRIEF DESCRIPTION OF THE DRAWINGS

FIG. 1 is a perspective view of a seat belt anchor device in accordance with the present invention showing a plate member, a spring retainer member configured to extend over a keyhole opening in the plate member, and a mounting stud on which the anchor device is installed;

FIG. 2 is an elevational view showing window openings in the spring retainer member, and an upper, seat belt opening in the plate member;

FIG. 3 is a cross-sectional view taken along line 3-3 of FIG. 2 showing a rivet connection of the spring retainer member to the plate member, a raised flange stop adjacent the rivet connection formed about the seat belt opening of the plate member, and a pair of arm portions of the spring retainer extending toward the plate member;

FIG. 4 is a cross-sectional view similar to FIG. 3 showing an enlarged head of the mounting stud received in the upper enlarged opening portion of the keyhole opening of the plate member engaging an indicator portion of the spring retainer member spaced from the plate member;

FIG. 5 is a cross-sectional view similar to FIG. 4 showing the anchor device shifted to an installed position relative to the mounting stud with the lower arm portion of the spring retainer member maintaining the plate member and stud in the installed position relative to each other;

FIGS. 6-10 are various views similar to FIGS. 1-5 of another seat belt anchor device having the intermediate arm portion serving as the indicator portion of the device with the stud head received in the enlarged portion of the keyhole opening;

FIGS. 11-15 are various, similar views of another seat belt anchor device having a spring retainer member with a proximate arm portion that serves as the indicator portion;

FIGS. 16-20 are various similar views of another seat belt anchor device showing a plate member with offset portions, and the intermediate arm portion serving as the indicator portion;

FIGS. 21-26 are various similar views of another seat belt anchor device having an intermediate arm portion including small end prongs for engaging the underside of the stud head in the installed position; and FIGS. 27-33 are various views of another seat belt anchor device having a spring retainer member that extends over the narrow slot portion of the keyhole opening and has integral stop structure to limit pivoting thereof.

DETAILED DESCRIPTION OF THE PREFERRED EMBODIMENTS

Figure 7:
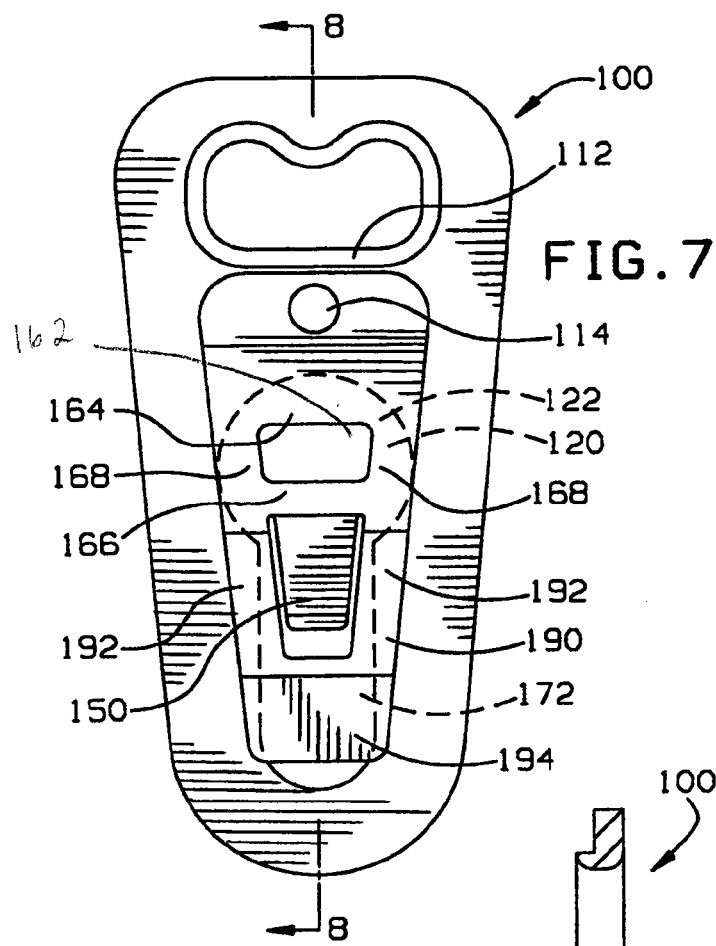

In FIGS. 1-5, a seat belt anchor device 10 is shown. The seat belt anchor device 10 includes a plate member 12 utilized to anchor a seat belt (not shown) to a stud 14 that can be in turn fixed to a lower portion of a seat frame, for example. The plate member 12 has a plate body 16 that can include an upper opening 18 for receiving seat belt webbing extending therethrough, and a opening 20 therebelow for receipt of the stud 14, as described hereinafter.

The plate body 16 has a relatively thin thickness between opposite surfaces 22 and 24, e.g. approximately 3.2 millimeters (see FIG. 3). The plate body 16 also has an elongate construction with sides 26 and 28 that are spaced from each other transversely across the plate body surfaces 22 and 24 by a much smaller amount than they extend along the length of the plate body 16 from proximate end 30 to distal end 32 thereof (FIG. 2). In this regard, the plate member 12 is provided with a long, narrow and thin construction which is advantageous for fitting it through a small opening in upholstery material used about a vehicle seat frame.

To keep the stud member 14 in its installed position as shown in FIG. 3, a spring retainer member 34 is connected to the plate body 16. As best seen in FIGS. 2 and 3, the spring retainer member 34 extends from its connection location adjacent the seat belt opening 18 down along the plate body 16 in overlying relation to the keyhole opening 20. Thus, the spring retainer member 34 extends over an enlarged proximate portion 36 of the keyhole opening 20 and then down along a narrower, slot portion 38 of the keyhole opening 20 down adjacent to a distal end 40 of the keyhole opening slot portion 38. The spring retainer member 34 includes an intermediate arm portion 42 and a distal arm portion 44 that cooperate to allow the stud 14, and specifically the enlarged head 47 thereof to move to its installed position at the distal end 40 of the keyhole opening slot portion 38 while maintaining it in the installed position relative to the plate member 12 thereafter. The spring retainer member 34 can be formed of a thin, spring plate material.

As illustrated, the spring retainer member 34 is preferably connected to the plate body 16 via a single fastening member such as rivet 46. By utilizing a single rivet 46, the assembly time for fastening the retainer member 34 to the plate body 16 is reduced in half over those prior anchor devices utilizing two rivets and corresponding riveting operations for connecting their corresponding spring and plate members, as previously discussed. For this purpose, the preferred location for the fastener is in connection area 48 between the seat belt opening 18 and the enlarged portion 36 of the keyhole opening 20. Since there is only a single rivet connection, the anchor device 10 also preferably includes a stop, generally designated 50 (FIG. 3), that limits pivoting of the retainer member 34 that may otherwise occur about rivet 46. As shown, the spring retainer member 34 includes a proximal end portion 52 that is riveted to the plate body surface 22 in the connection area 48. The stop 50 is preferably raised from the plate body surface 22 adjacent the riveted end portion 52, as best seen in FIGS. 2 and 3. In this manner, the stop 50 restricts pivoting of the spring retainer member 34 via abutment between the retainer end portion 52 and the stop 50 such as during installation of the seat belt anchor device 10 onto the stud 14.

The stop 50 can be formed integrally with the plate body 16 and be in the form of a raised flange 54 that extends about the periphery of the seat belt opening 18. In this instance, the single fastener member connection provides advantages in terms of the part count for the seat belt anchor device 10. Instead of requiring four distinct parts where two are rivets utilized to connect the spring retainer and plate members, the part count is reduced by 25% so that only three (3) distinct parts are needed which are the plate member 12, the spring retainer member 34 and the rivet member 46. The reduced part count of the seat belt anchor device 10 herein provides part cost reduction accordingly.

More particularly, the plate body has a central, longitudinal axis 56 with the sides 26 and 28 equally spaced therefrom. The openings 18 and 20 are bisected by the axis 56 and the rivet connection is aligned along the axis 56, as can be seen in FIG. 1. The spring retainer member 34, and particularly the connection end portion 52 thereof extends transversely on either side of the axis 56. Accordingly, the flange 54 also includes a lower portion 58 along the lower edge of the transversely extending seat belt opening 18 that also extends on either side of the axis 56 for a distance substantially the same as the connection end portion 52 of the spring retainer member 34. In this manner, the spring retainer member 34 is substantially restricted against pivoting about the rivet 46 and maintained in its aligned orientation extending along the longitudinal axis 56 even during installation with camming of the spring retainer arm portions 42 and 44 against the stud head 47, shown in FIGS. 4 and 5.

As previously mentioned, the plate body 16 has an elongate construction so that the length between the ends 30 and 32 thereof is significantly greater than the width between the sides 26 and 28 thereof. In this regard, the connection area 48 is enlarged particularly in the longitudinal direction along axis 56 to accommodate the rivet connection, and preferably is at least as large in the longitudinal direction as the diameter of the rivet head 60 which clamps the connection end portion 52 of the spring member 34 to the plate body surface 32.

Continuing with reference to FIGS. 1 and 2, the enlarged portion 36 of the keyhole opening 20 can have a generally circular configuration with its center on the plate axis 56. The opening 36 has a diameter approximately the same as the transverse width of the spring retainer end portion 52 which, in turn, is approximately the same as the width of the seat belt opening 18, as previously mentioned. The slot portion 38 is narrower than the diameter of the circular portion 36 by about half and is centrally aligned with the plate axis 56. Extending along the keyhole opening 18 is the spring retainer member 34. From the proximal end portion 52, the retainer member 34 includes an upstanding portion 62 that transitions to an indicator or bridge portion 64 of the spring retainer member 34 extending substantially parallel to the plate body 16, and particularly the surface 22 thereof. The indicator portion 64 and specifically inner surface 64a thereof is preferably spaced from the plate body portion surface 22 by a distance that is slightly less than the thickness of the stud head 47, as will be discussed further hereinafter.

The diameter of the stud head 47 is less than the diameter of the keyhole portion 36 but greater than the width of the slot portion 38. On the other hand, the diameter of the stud shank 67 (FIG. 4) is less than the width of the keyhole slot portion 38. Accordingly to fix the plate member 12 to the stud 14 in the FIG. 3 installed position, the plate member 12 is lowered down through a small opening formed between upholstery material or the upholstery and the seat frame until the keyhole opening portion 36 is aligned with the stud 14. The installer then shifts the plate member 12 toward the aligned stud 14 so that the head 47 thereof fits through the opening 36. Because the head 47 preferably has a greater axial thickness than the spacing between the spring retainer indicator portion 64 and the plate surface 22, the installer will feel the stud head 47 in engagement with the spring indicator portion 64 during this stage of the installation procedure if proper alignment is present. In this manner, the spring indicator portion 64 provides the installer with a tactile indication that the stud head 47 is properly aligned with the enlarged portion 36 of the keyhole opening 20 and has been fit therethrough relatively early in this stage of the installation procedure.

The installer then needs to continue moving the plate member 12 toward the stud 14 along the axis 14a thereof with the spring retainer member 34 flexing slightly by a sufficient amount until the full thickness of the stud head 47 fits entirely through the keyhole opening portion 36. The spring indicator portion 64 preferably includes a window opening 66 formed therein so as to reduce resistance to resilient flexing of the spring member 34 thereat when the stud head 47 is moved into the enlarged portion 36 of the keyhole opening 18. By this slight resistance to the movement of the plate member 12 along the axis 14a of the stud 14, the installer will have an early tactile indication that the plate member 12 and stud 14 are properly aligned for installation. By contrast, where no such spring indicator portion is provided, the installer only receives this tactile feedback after the plate member 12 has been moved axially by a greater amount than is necessary and with the stud head 47 potentially unduly spaced from the plate surface 22 which can cause difficulties in continued installation of the anchor plate member 12, as described below. The indicator portion 64 herein also provides an additional advantage in that it provides the spring retainer member 34 with a low profile configuration relative to the plate body 16 as the spring retainer member 34 and particularly the indicator portion 64 thereof is not spaced as far from the plate body as in prior art anchor devices. This enables the anchor device 10 herein to be fit through smaller openings in the dimension transverse to the length and width of the plate and spring retainer members 12 and 34 of the seat belt anchor device 10.

With reference to FIG. 2, there are proximal and distal sections 68 and 70 of the spring indicator portion 64 that extend laterally above and below the window opening 66, as well as interconnecting sections 69 and 71 on either side of the opening 66 extending between the sections 68 and 70. In this regard, the indicator portion 64 is sized to extend over the enlarged circular portion 36 of the keyhole opening 20 so that the proximal section 68 extends across the upper section of the circular opening portion 36 and the distal section 70 extends across a lower section of the circular opening portion 36. The distal arm portion 44 of the spring retainer member 34 extends down toward the plate surface 22 from the distal section 70 via a pair of side sections 72 and 74 thereof joined at their distal ends by a lateral section 76. The side sections 72 and 74 and lateral section 76 bound an opening 78 from which the intermediate arm portion 42 is punched out. Accordingly, the distal arm portion 44 has a generally U-shaped configuration and the intermediate arm portion 42 has a tabbed shaped configuration.

The distal arm portion 44 extends at an oblique angle to the indicator portion 64, and is sized so that the lateral section 76 thereof is spaced from the end 40 of the keyhole slot portion 38. In this regard, the configuration of the spring retainer member 34 and particularly the distal arm 44 thereof is such that the lateral section 76 normally lies against or closely adjacent to the plate surface 22 extending across the area of the slot portion 38 at which the center of the circular stud head 47 will be disposed in its installed position, as shown in FIGS. 2 and 3. As can be seen in FIG. 3, the transverse section 76 is bent from the side sections 72 and 74 to extend generally along the plate body 16 at a slight oblique angle thereto.

The intermediate arm portion 42 also extends at an oblique angle to the spring retainer indicator portion 64 and particularly the transverse section 70 thereof, but at an angle that is not as great as the angle between the distal arm portion 44 and the indicator portion 64. In this manner, the arm portion 42 ends at a point further up along the keyhole slot portion 38 than does the distal arm portion 44. The intermediate arm portion 42 includes a free end section 80 that is bent to extend at a greater angle relative to the plate surface 22 than the remainder of the arm portion 42. The end section 80 is positioned along the slot opening portion 38 of the keyhole opening 20 and spaced from the lateral section 76 of the arm portion 44 such that it resides adjacent the stud head 47 with the stud 14 in its installed position, as shown in FIG. 5.

Referring to FIG. 4, with the plate 12 moved axially in the direction indicated by the arrow head on the stud axis 14a to move the stud head 47 through the circular portion 36 of the keyhole opening 20 into resilient engagement with the indicator portion 64, the installer will know that some slight continued axial shifting of the plate member 12 is needed against the bias force provided by the engaged spring retainer member 34 for orienting the lower surface 47a of the stud head 47 to be closely adjacent to the plate surface 22 for sliding therealong. Accordingly, the spring retainer portion 64 provides the installer a tactile indication both that they have the plate 12 properly aligned with the stud 14 in the initial stage of the anchor installation and that they only need to continue movement of the plate member 12 along the stud axis 14a by a slight amount, e.g. 19 millimeters, to complete this installation stage or movement to be able to properly and easily undertake the next stage of the installation described hereinafter. This is in contrast to the situation where an installer may have to move the plate back and forth along the stud axis before obtaining the proper orientation of the stud head relative to the plate surface through the keyhole opening for the next installation movement.

In the next stage of the installation, the installer pulls the plate 12 upwardly with the stud head 47 first engaging the intermediate arm portion 42 as the stud shank 67 begins to move into the keyhole slot portion 38. With application of a continued upward pulling force on the plate 12 by the installer, the spring retainer 34 is cammed away from the plate surface 22 by engagement of the stud head 47 with the inner, inclined surface 42a of the intermediate arm portion 42. As the stud 14 continues to be shifted down the slot portion 38, the stud head 47 will also cammingly engage the inner, inclined surface 44a of the distal arm portion 44 including the lateral section 76 of the distal arm portion 44. Once the stud shank 67 is shifted to the end 40 of the keyhole slot portion 38, the stud head 47 will have cleared the abutment or end section 80 of the intermediate arm portion 42 with the lateral section 76 of the distal arm portion 44 generally aligned along the axis 14a of the stud 14 and engaged with the stud head 47, as shown in FIG. 3. In this regard, after the stud head 47 clears the intermediate arm portion 42, the spring retainer member 34 and particularly the intermediate arm portion 42 springs back toward the plate surface 22 to bring the abutment section 80 back into interfering or facing relation with the stud head 47.

In this manner, the intermediate arm portion 42 maintains the plate 12 and stud 14 in their installed position relative to each other keeping the stud 14 from backing out or shifting upwardly in the keyhole slot portion 38. Further, the stud 14 generally has an annular collar 82 formed at an intermediate position along the stud shank 67 spaced from the head 47, as best seen in FIG. 5. Accordingly, the bias force provided by the spring retainer member 34 via the transverse section 76 of the distal arm portion 44 thereof acts to keep the stud head lower surface 47a firmly engaged against the plate surface 22, thereby limiting any rattling of the plate body 16 between the stud head 47 and collar 82 extending about the stud shank 83. Since the stud 14 is fixed, the bias force exerted by the distal arm portion 44 of the spring retainer 34 causes the plate 12 to be drawn toward the stud head 47 so that the plate surface 22 firmly engages against the underside 47a of the stud head 47.

The present seat belt anchor device 10 has been optimized in many respects in terms of its ease of installation, particularly with respect to the force needed to shift the stud 14 to its installed position at the bottom of the keyhole slot portion 38. In this regard and as previously mentioned, the spring retainer arm portions 42 and 44 both project downwardly from the spring indicator portion 64, and specifically the lower lateral section 70 thereof that is generally disposed over the lower section of the keyhole opening enlarged portion 36 and the juncture between the keyhole opening portions 36 and 38. In this way, the oblique angles that the arm portions 42 and 44 make with the spring retainer indicator portion 64 are more gradual than would otherwise be possible if the arms 42 and 44 started from locations further down along the keyhole opening 20. Further, the gradual angling of the arm portions 42 and 44 is further enhanced by the low profile of the spring retainer member 34, and particularly the indicator portion 64 thereof relative to the plate body 16. In addition, the elongate construction of the plate body 16, including the length of the keyhole opening 20, and the slot opening portion 38 thereof is another factor in allowing for the arm portions 42 and 44 to extend at a more gradual oblique angle toward the plate surface 22. This gradual angling creates less of a blunt impact between the arm portions 42 and 44 and stud head 47 lowering camming forces therebetween and thus the force needed to be exerted by the installer in pulling the plate member 12 upwardly during the anchor installation procedure.

By way of example and not limitation, the angle between the arm portion 42 and the indicator portion 64 and specifically the respective inner surfaces 42a and 64a thereof facing the plate surface 22 can be between approximately 155° to approximately 160°, and the angle between the inner surfaces 44a and 64a of the distal arm portion 44 and the spring retainer indicator portion 64, respectively, can be approximately 167°. The distance between the spring retainer indicator portion surface 64a and the plate surface 22 can be between approximately 4 millimeters to approximately 5 millimeters. The length of the keyhole opening 20 can be approximately 45 millimeters, with the diameter of the enlarged circular portion 36 being approximately 20 millimeters and the length of the elongate slot portion 38 being approximately 25 millimeters and width thereof being approximately 11 millimeters. The length of the plate body 16 between the ends 30 and 32 can be between approximately 78 millimeters to approximately 82 millimeters.

Turning to more of the details, the plate body 16 can also be provided with a lower lead-in portion 84 having a wedge shape configuration. Along the plate body lower portion 84, the plate body sides 26 and 28 taper toward each other and are interconnected by the curved end 32 of the plate body 16. On the other hand, the upper portion 86 of the plate body 16 has the sides 26 and 28 extending in more of a parallel relation to each other. As illustrated, the juncture between the keyhole opening portions 36 and 38 generally can be aligned with the juncture between the plate body portions 84 and 86 so that the keyhole opening enlarged portion 36 is formed in the wider, plate body upper portion 86 and the keyhole opening slot portion 38 is formed in the narrower, plate body lower portion 84. Along with the low profile provided by the configuration of the spring retainer member 34, the wedge shape lead-in portion 84 assists in inserting the plate member 12 through a small opening at the upper portion of the seat to which the anchor device 10 is to be fixed via the stud 14. By way of example and not limitation, the distance across the sides 24 and 26 at the plate body upper portion 86 can be between approximately 40 millimeters to approximately 58 millimeters, and the smallest spacing of the sides 26 and 28 along the lower lead-in portion 84 of the plate body 16 can be approximately 28 millimeters, prior to curving to be interconnected by the curved, plate body end 32.

As previously mentioned, the illustrated stop 50 is in the form of an integral, raised flange 54 that extends about the entire perimeter of the transversely extending, seat belt opening 18. Advantageously, the flange 54 can be contoured to provide the seat belt with a smooth bearing surface for engaging therewith with the seat belt extending through the opening 18. Further, the seat belt opening 18 can be provided with a pair of lobe portions 88 and 90 defined by an indent portion 92 of the plate body 16 and flange 54. This lobed configuration of the seat belt opening 18 provides the seat belt with a greater surface area of contact as it is tensioned so that the belt bears against the upper indent portion 92 of the plate body 16 and flange 54.

Turning now to FIGS. 6-10, an alternative seat belt anchor device 100 is depicted. The seat belt anchor device 100 has a spring retainer member 102 and a plate member 104 that is secured to the vehicle in a manner similar to the above-described anchor device 10. Except for the manner in which the installer is provided with tactile feedback regarding the position of the stud head in the keyhole opening, the anchor device 100 is substantially the same as anchor device 10. To this end, the spring retainer member 102 has a proximal end portion 106 near a seat belt opening 108 having a stop 110 in the form of raised flange 112 extending thereabout. Accordingly, the spring retainer member 102 may be secured to the anchor device 100 with a single fastener such as a rivet 114, as described above, such that the stop 110 inhibits pivoting movement of the spring retainer 102 relative to the plate member 104 about the single rivet 114, which otherwise may occur during installation of the anchor device 100 with a stud 116 or during operation and/or collision of the vehicle. In this manner, the anchor device 100 benefits from reduced manufacturing time, and a minimum number of parts is required.

Figure 8:
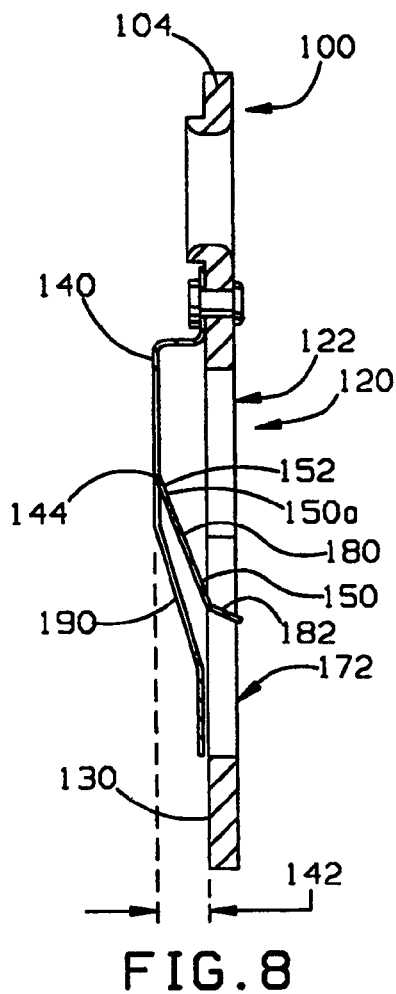

The spring retainer member 102 provides an early tactile indication of receipt of a stud 116, mounted on the vehicle, within a plate keyhole opening 120 similar to spring retainer member 34. However, to do so the spring retainer member 102 utilizes an intermediate arm portion 150 thereof for this purpose, as described hereinafter. The keyhole opening 120 has an enlarged opening portion 122 sized to permit a head 118 of the stud 116 to be received therein. The spring retainer 102 has an upstanding portion 124 extending from the proximal portion 106 and away from surface 130 of the plate body 104. Referring to FIGS. 6 and 8, the upstanding portion 124 transitions to and positions a bridge portion 140 that extends generally parallel to the plate body front surface 130 at a clearance distance 142 therefrom that is greater than the axial thickness 160 of stud head 118. The intermediate arm portion 150 extends toward the plate surface 130 from the bridge portion 140 to form a bend 144 therebetween, similar to the above-described intermediate arm portion 42.

Figure 9:
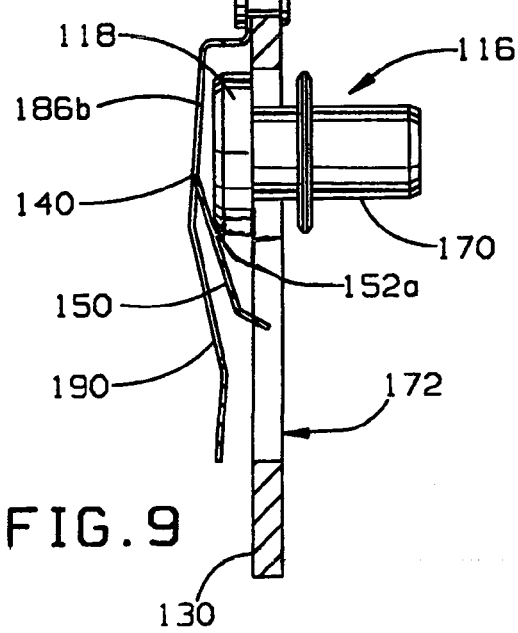

Continuing reference to FIG. 8, the intermediate arm portion 150 is positioned to provide tactile feedback to an installer when the stud head 118 is received into the enlarged opening portion 122. More specifically, the intermediate arm portion 150 is positioned further up toward the proximal end portion 106 compared to intermediate arm portion 42 of the previously described spring retainer 34 such that a base portion 152 of the intermediate arm 150 adjacent the bend 144 is overlying the enlarged portion 122 of the key hole opening 120. Rather than engaging the bridge portion 140 as the plate member 104 via the keyhole opening portion 122 thereof is being advanced over the stud head 118, it is the bent intermediate arm portion 150 that engages the stud head 118 received in the enlarged portion 122 of the keyhole opening 120, as shown in FIG. 9.

Accordingly, it is the arm portion 150 that provides the installer a tactile indication that the stud 116 is properly aligned with the keyhole opening 120, and particularly the enlarged, circular portion 122 thereof. With the stud head 118 engaged with the intermediate arm portion 150, the installer will know that the head 118 is properly received in the enlarged portion 122 of the keyhole opening whereby only a slight additional amount of movement of the plate member 104 along the stud axis is required so that the underside 118a of the stud head 118 is positioned for sliding along and on the plate surface 130 on either side of the slot portion 172 of the keyhole opening 120 during the upward lifting movement of the plate member 104 for installation of the anchor device 100. As previously discussed, this feedback for proper positioning of the stud head 118 relative to the plate member 104 reduces the force needed for the upward lifting movement of the plate member 104 during installation. One advantage of utilizing the intermediate arm portion 150 as an indicator is that it is formed so that its base portion 152 is further up along the plate member 104 than that of the arm portion 42. Accordingly, the arm portion 150 has a more gradual bend or angle toward the plate member 104 so that the camming force needed for the stud head to clear the free end portion 182 of the plate arm 150 for shifting the plate member 104 to the installed position as shown in FIG. 10 is reduced over that needed to cam the arm portion 42 during installation.

Referring now to FIG. 7, the spring retainer 102 has a window opening 162 in the bridge portion 140 thereof, similar to the window 66 of the spring retainer 10. The window 162 is bound by sections of the spring retainer bridge portion 140, specifically an upper or proximal lateral section 164, a lower or distal lateral section 166, and interconnecting side sections 168. In comparison to the spring retainer 10, the interconnecting side sections 168 are shorter than the interconnecting side sections 69, 71. The interconnecting side sections 168 are sized so that the bend 144 between the intermediate arm portion 150 and the bridge portion 140 is formed in a more proximal position such that the bend 144 is positioned to overly the enlarged opening portion 122, thus allowing the intermediate arm portion 150 to overlap or overlie the opening portion 122, as described above.

The spring retainer 102 secures the plate 104 to the stud 116 and, hence, to the vehicle. The plate member 104 is shifted so that the stud head 118 is received in the opening 122, and the spring retainer 102 and intermediate arm portion 150 deflect outwardly, thus providing the tactile feedback to an installer so they can precisely position the stud head 118 slightly beyond the plate surface 130 for sliding thereon. The anchor device 100 may be then drawn upwardly so that a shank 170 of the stud 116 passes into a slot portion 172 of the keyhole opening 120. The intermediate arm portion 150 and the spring retainer 102 are deflected outwardly by a camming action between the stud head 118 and, initially, the base portion inner surface 152a, and then a camming action between the stud head 118 and the inner surface 150a of the intermediate arm portion 150 in general.

With sufficient relative shifting downward along the slot portion 172, the stud 116 moves to a position beyond the intermediate arm portion 150 such that the intermediate arm portion 150 resiliently returns to a blocking or interfering position relative to the stud 116 to substantially retain the stud 116 in the installed position at the distal end of the slot 172 against backing out therefrom. As can be seen, the intermediate arm portion 150 includes upper and lower incline portions, 180 and 182. When the intermediate arm portion 150 resiliently shifts inwardly or backs toward the plate member 104, the lower incline portion 182 shifts to a position proximate and above the stud head 118, as shown in FIG. 10. Additionally, the lower incline portion 182 may shift to a position so that it extends within the slot opening 172, above the stud shank 170.

Once moved to the installed position, any significant downward motion of the anchor device 100, relative to the stud 116, brings the stud head 116 into contact with the retainer arm 150. Due to the angle of inclination of the intermediate portions 180, 182, force applied by the stud 116 against the intermediate arm 150 will only push the intermediate arm portion 150 further inwardly, thus providing a resilient stop to restrict relative motion of the stud 116 upwardly along the slot opening 172.

As with the previously described spring retainer 34, the spring retainer 102 also provides a spring bias against the stud 116 to minimize rattling. Extending downwardly and inwardly toward the plate member 104 from the lateral section 166 of the bridge portion 140 is a distal arm portion 190. The distal arm portion 190 includes inclined side portions 192 and a laterally extending portion 194. Once the intermediate arm portion 150 is drawn past the stud head 118, the distal arm portion 190 shifts inwardly to resiliently engage the stud head 118. The distal arm portion 190 is spring-like and presses against the stud head 118. Since the stud 116 is fixed, the bias or pressing by the distal arm 190 causes the plate surface 130 to be drawn into tight engagement with the lower surface 118a of the stud head 118 on either side of the key hole slot 172 to minimize rattling between the anchor device 100 and stud 116 during operation of the vehicle.

Another anchor device 200 having a spring retainer 202 and a plate 204 for being secured with a stud 206 mounted on a vehicle is depicted in FIGS. 11-15. The anchor device 200 is similar in many respects to the previously described anchor devices 10 and 100. As can be seen, the spring retainer 202 is secured to the plate 204 by a single fastener such as a rivet 214, and pivoting of the spring retainer 202 is limited by a stop 210 formed on the plate 204. The spring retainer 202 is secured such that a top edge 202a is positioned proximate the stop 210, which itself is preferably at a bottom edge 208a of a seat belt opening 208 and formed by a flange 212 formed around the seat belt opening 208. As discussed above, such a construction simplifies the manufacturing process and reduces the number of parts used in comparison to prior anchor devices.

Figure 15:
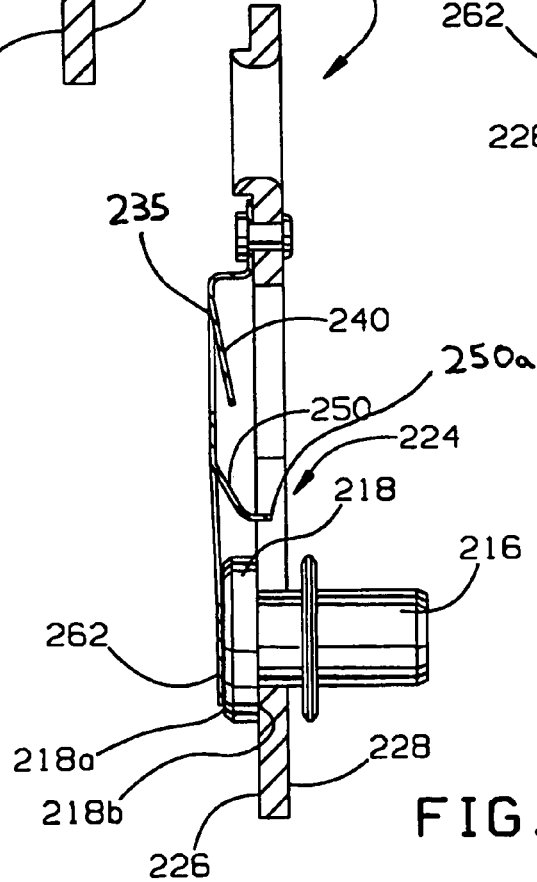
Figure 16:
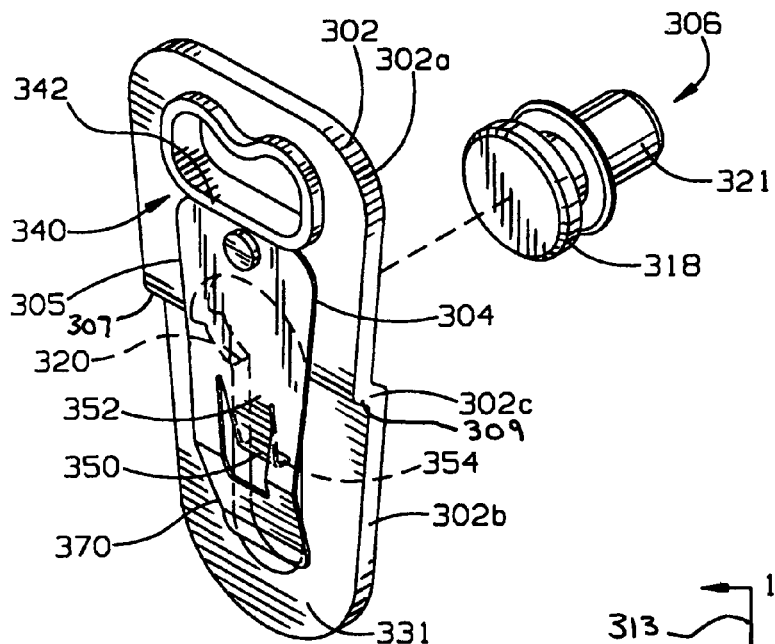

The plate 204 has a keyhole opening 220 for securing the anchor device 200 to the stud 206. The stud 206 has a shank 216 and a head 218, the head 218 being of a larger diameter than the shank 216 and having a bottom surface 218a facing the shank 216 and a top surface 218b on an opposite side from the shank 216 (FIG. 15). The keyhole opening 220 has an enlarged opening portion 222 sized to permit the diameter of a head 218 of the stud 206 to pass therethrough. Additionally, the keyhole 220 has an elongated slot portion 224 extending downward from the enlarged opening portion 222. The slot portion 224 has a lateral width less than the diameter of the stud head 218, while larger than the shank 216. Accordingly, installation of the anchor device 200 is performed by aligning the stud 206 with the enlarged portion 222, shifting the anchor device 200 toward the stud 206 such that the stud head 218 is received within the enlarged portion 222, and raising or lifting the anchor device 200 relative to the stud 206 such that the shank 216 is guided along the slot portion 224 and the bottom surface 218a of the stud head 218 slidingly engages surface 226 of the plate 204.

Figure 13:
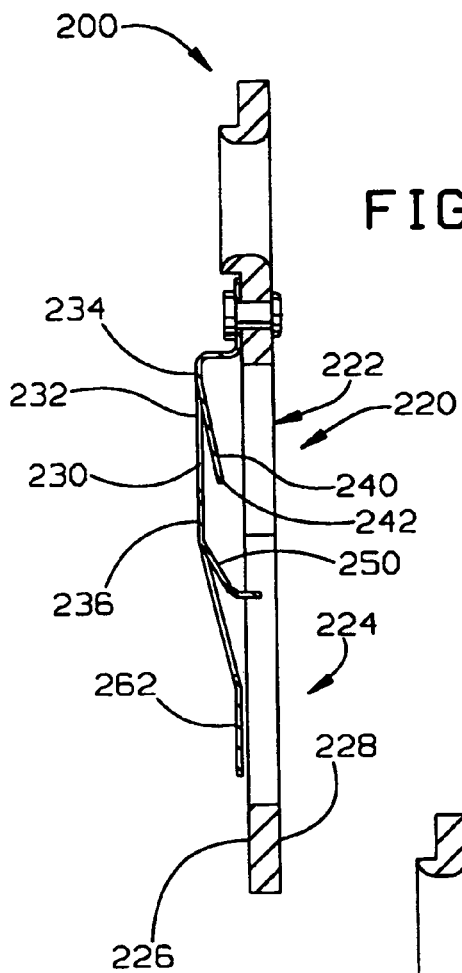

The spring retainer 202 also provides an early tactile indication to an installer that the stud head 218 has been properly received within the enlarged opening 222. As described with reference to FIG. 2, the spring retainer 34 has a window opening 66 formed in the indicator portion 64 and bound by the four sections 68, 69, 70, and 71. The window 66 is formed by completely removing of a portion of the material during the fabrication process, such as by stamping. In contrast, the spring retainer 202 of the anchor device 200 has a window 230 formed in a raised, bridge portion 232 and bound by upper and lower bridge sections 234, 236, and opposite side sections 238, such that removal of the material does not occur. Instead, an indicator portion or proximal arm 240 is bent from the upper bridge portion 234 at 235 and positioned to extend at an oblique angle relative to remaining sections 234, 236 and 238 of the bridge portion 232 over the enlarged portion 222 of the keyhole opening 220 toward the plate 204, as best seen in FIG. 13.

In this manner, when the stud head 218 is received within the enlarged opening 222, it will contact the indicator arm 240 to provide the tactile feel to the installer. Prior to full receipt of the stud head 218 in the enlarged opening 222, a terminal edge 242 of the indicator arm 240 is spaced from the plate 204, and specifically surface 226 thereof by a distance less than the axial thickness of the stud head 218. The stud head 218 passes into the enlarged opening 222 and contacts the indicator terminal edge 242, which the installer will recognize by feel as being proper receipt. The installer then knows that the plate 204 only needs to be shifted axially, i.e., along the stud axis, a slight amount further so that the stud head 218 can be precisely positioned with its underside 218b only slightly beyond the plate surface 226 for sliding thereagainst during the next installation movement.

Figure 14:
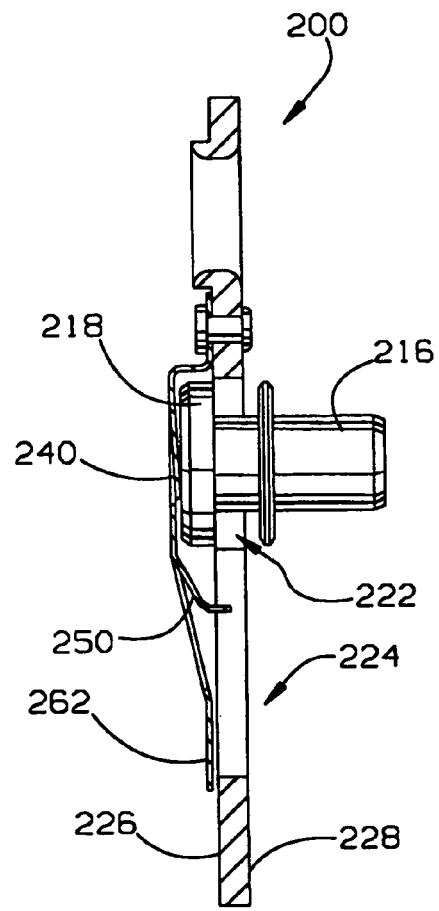

As can be seen, the indicator arm 240 extends toward the plate top surface 226 and downwardly at an oblique angle so that it is directed toward the slot portion 224. The indicator arm 240 is spring-like such that force thereagainst will deflect the indicator arm 240 outwardly away from the plate member 204 and into the window opening 230, as can be seen in FIG. 14. The indicator arm 240 configuration, stamped and bent from the bridge portion 232, allows it to resiliently deflect about the bend 235 when pushed by the stud head 218 before any significant shifting of the remainder of the spring retainer 202 occurs. This configuration allows the bridge portion 232 to provide a secondary tactile indication to the installer so that they have positive feedback as to when the stud head 218 is in proper position for lifting of the anchor device 200 with relative ease in terms of the resistance provided by the spring retainer 202. The bridge portion 232 is spaced from the plate surface 226 by a predetermined amount generally corresponding to the axial thickness of the stud head 218 between surfaces 218a and 218b thereof. In this manner, once the stud head 218 has deflected the indicator arm 240 into the widow opening 230 to be co-planar with the bridge sections 234-238, the stud head 218 will be engaged with the bridge portion 232 which generates additional resistance to continued shifting of the anchor device 200 over the stud 216. This provides the installer with additional tactile feedback over that provided by indicator arm 240 that the stud head 218 is now properly positioned through the keyhole opening portion 222 so that its underside 218b can slide along plate surface 226 during the lifting movement of the anchor device 200.

The spring retainer 202 further includes an intermediate arm portion 250 and a distal arm portion 260, most similar to those described for the anchor device 10. The intermediate arm portion 250 is stamped from plate material forming the distal arm portion 260 leaving window opening 251 therein and so that the arm portion 250 extends inwardly toward the plate 204 and downwardly from the bridge portion 234 at an oblique angle relative to the bridge section 236. Lifting the plate member 204 with the stud 206 in its FIG. 14 position will cause the stud head 218 to travel along and against the surface 226 of the plate 204 deflecting the intermediate arm portion 250 outwardly until the stud head 218 has cleared the free end 250a thereof in the slot opening 224. The resilient intermediate arm portion 250 then returns inwardly to a blocking position to limit the ability of the stud 206 to shift back up the slot opening 224, thereby securing and retaining the stud 206 in the installed position in the slot opening 224, as shown in FIG. 15. Once the intermediate arm portion 250 has shifted inwardly, the distal arm portion 260 also shifts inwardly back toward the plate member 204 so that an end lateral section 262 presses against the stud head top surface 218b to bias the stud head bottom surface 218b and the plate surface 226 against each other, thereby minimizing rattling between the stud 206 and anchor device 200, such as during operation of the vehicle.

Another anchor device 300 is shown in FIGS. 16-20 having an alternative plate member 302 and a spring retainer member 304, similar to spring retainer member 102, for securing with a stud 306 of a vehicle, as has been described above. The plate member 302 has a body 303 that is generally elongate and tapered in a downward direction, and is of generally rigid construction as has been described for the previously discussed anchor devices. In contrast to those of the prior anchor devices, the plate body 302 has offset portions including an upper portion 302a generally extending in a first plane, a lower portion 302b generally extending in a second plane offset from and parallel to the first plane, and a transversely-extending transition portion 302c, or jog, between the upper and lower portions 302a and 302b. As will be discussed, this configuration provides advantages for locating and securing the anchor device 300 with the stud 306 in terms of keeping the profile of the device 300 to a minimum, and particularly the spring retainer member 304 relative to the plate member 302.

Figure 17:
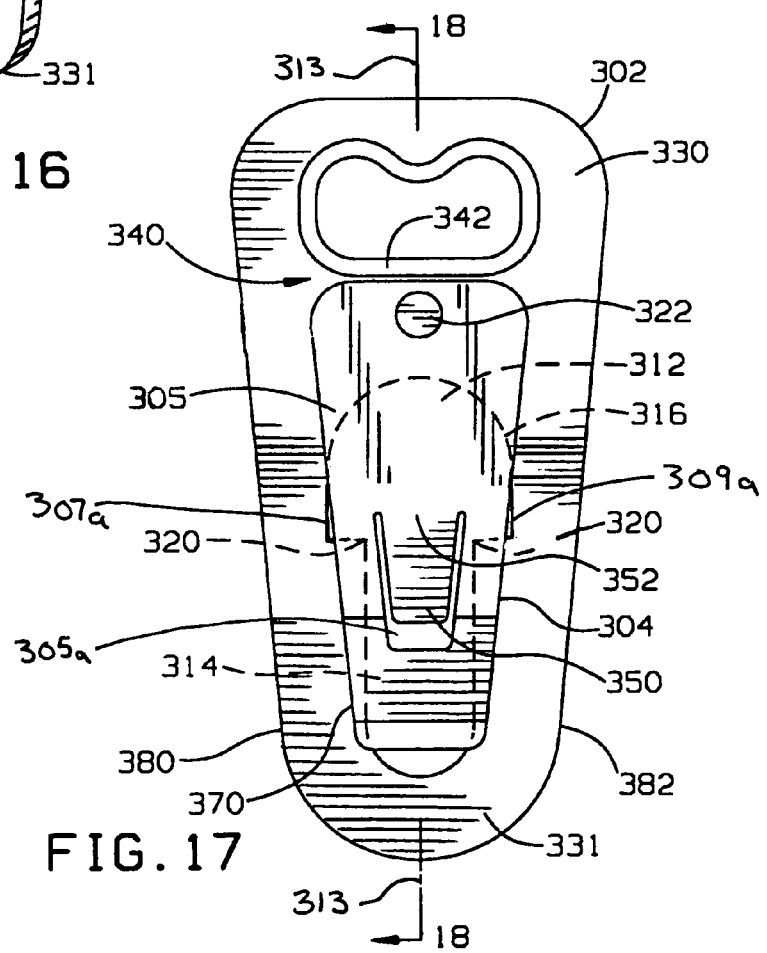

The plate member 302 has a keyhole opening 310 for receiving the stud 306. The keyhole opening 310 includes an enlarged opening portion 312 sized for receiving an enlarged stud head 318 having a lower surface 318a and an upper surface 318b, and a slot portion 314 having a width greater than the diameter of the stud shank 321 but smaller than the diameter of the stud head 318. The enlarged opening position 312 extends in both of the offset plate portions 302a and 302b, and thus through the transverse plate portion 302c, as well. Accordingly, the transverse plate portion 302 includes two side sections 307 and 309 that extend along either side of the large portion 312 of the keyhole opening 310. To provide clearance for the stud head 318 when received in the opening portion 312 and the plate 302 is lifted during installation, the opening portion 312 preferably has a D-shaped configuration, as shown in FIG. 17. Accordingly, the side sections 307 and 309 have inner edges 307a and 309a that extend generally parallel to each other lengthwise along the longitudinal axis 313 of the plate on either side of the D-shaped opening portion 312.

As the stud head 318 is being positioned within the enlarged opening 312, the spring retainer 304 provides a tactile indication of proper receipt therein. More specifically, the spring retainer 304 is secured to the plate 302 by a fastener, such as a rivet 322, at a connection area 324 of the plate 302 with the area 324 being located above the enlarged opening 312 and below seat belt opening 344 in the plate body 303, as with the previously-described anchor devices. The spring retainer 304 includes an upper or proximal end portion 305 extending downwardly from the connection area 324 along surface 330 of the upper plate portion 302a, over and beyond the enlarged opening 312 to extend over the slot portion 314 of the keyhole opening 310 formed in the lower plate portion 302b. This is in contrast to the previously-described anchor devices that have a bridge portion of the spring retainer that is raised for its entire extent from the plate member to extend over the circular opening of the keyhole. In this manner, the spring retainer 304 does not have as much of the resiliently flexible material thereof spaced from the plate body 303, specifically in the area of the enlarged portion 312 of the keyhole opening 310. Accordingly, the spring retainer 304 is less likely to create an obstacle or catch on surrounding structure during installation of the anchor device 300 on the stud 306.

The spring retainer 304 is secured against pivoting relative to the plate 302 like the previously-described anchor devices. The plate body 303 includes a stop 340 such as a raised flange 342 formed around a seat belt opening 344, and an upper edge 304a of the spring retainer 304 is positioned to extend closely adjacent to the flange 342. This blocks pivoting movement of the spring retainer 304 relative to the plate 302, as described above.

The spring retainer 304 includes an intermediate arm portion 350, which provides an early tactile indication of proper receipt of the stud head 318 within the enlarged opening 312 similar to the spring retainer arm portion 150 of the previously-described anchor device 100. The intermediate arm portion 350 is stamped and extends transversely from the upper portion 305, angling down and toward the lower plate portion 302b and leaving window opening 305a in the upper portion 305 of the spring retainer 304. As can be seen in FIG. 18, the intermediate arm portion 350 is positioned with a base portion 352 generally overlying a lower portion 312a of the enlarged opening portion 312 formed in the lower plate portion 302b.

The plate body portions 302a and 302b are offset by a predetermined amount from each other by the transition portion 302c generally corresponding to the thickness of the stud head 318 between the surfaces 318a and 318b thereof, and the spring retainer arm portion 350 is positioned and configured so that it provides the installer with the tactile feedback as has previously been described. More specifically, when the stud head 318 is received within the enlarged opening 312, the top surface 318b at a lower, leading edge 318c thereof contacts the intermediate arm base portion 352 prior to full receipt of the stud head 318 beyond the lower portion 312a of the enlarged opening 312 in the lower plate portion 302b. At this point, the installer knows only a slight additional amount of shifting along the stud axis will position the stud head 318 properly so that its underside 318a can slide along plate surface 331 of the plate body lower portion 302b to allow for relative ease in the lifting installation movement of the anchor device 300. This additional amount of shifting will position the stud head 318 so that it has shifted through the lower opening portion 312a while being received in upper opening portion 312b of the keyhole circular opening 312, as was shown in FIG. 19.

The spring retainer portion 305 also provides the installer with a secondary tactile indication that the stud head 314 is in proper position relative to the plate member 302 for the lifting installation movement thereof. After initial engagement with the base portion 352 of the arm 350, continued axial shifting of the plate 302 along the stud axis pushes the arm 350 into the window opening 305a of the spring upper portion 305 and brings the stud top surface 318b into engagement therewith, as shown in FIG. 19. At this point, the underside 318a of the stud head 318 is properly positioned for sliding on and along the plate surface 331 to minimize the amount of resistance generated by the spring retainer arms 350 and 370 with upward lifting of the plate member 302 during installation. In this regard, it can be seen the thickness of the plate body 303, particularly at the upper portion 302a thereof is substantially the same as the stud head thickness. In the illustrated and preferred form, the plate body 303 is of constant thickness so that all the plate body portions 302a-302c are of substantially the same thickness as each other.

The intermediate arm 350 is operable to keep the stud 306 in the installed position at the bottom or lower end of the keyhole slot 314. As can be seen, the intermediate arm 350 has a distal tip 354 extending into the slot opening 314. The anchor device 300 is drawn upwardly once the stud head 318 is sufficiently received within the enlarged opening 312 such that the stud head bottom surface 318a may pass along the surface 331 of the lower plate portion 302b, with the shank 321 aligned with and shifted in the slot portion 314. During this lifting motion, the stud head 318 deflects the intermediate arm 350 outwardly away from the plate member 302 to permit the stud head 318 to pass between the intermediate arm 350, and specifically the distal tip 354 thereof, and the plate surface 331. Once the stud head 318 has cleared the distal tip 354, the intermediate arm portion 350 returns to a position where its distal tip 354 is again positioned within the slot opening portion 314 adjacent the stud head 318, as is shown in FIG. 20. In such an installment, return of the stud head 318 back up along the slot opening 314 is blocked as the intermediate arm portion 350 is in an interference position therewith. Upward force by the head 318 against the intermediate arm portion 350 only pushes the intermediate arm portion 350 further into the slot opening 314 resiliently blocking upward movement of the stud 306 therein.

The spring retainer 304 also includes a generally U-shaped distal arm portion 370 from which the arm portion 350 is formed with its lower bent section extending transversely relative to the upper portion 305 toward the plate surface 331. Once the stud 306 is properly positioned in the slot opening 314 and below the intermediate arm portion 350, the distal arm portion 370 presses against the stud head top surface 318b so that the stud head bottom surface 318a is generally firmly engaged against the lower plate section surface 331.

The anchor device 300 is configured to ease insertion within the seat trim, similar to that described above for each anchor device. The distal arm portion 370 forms a lead-in ramp, and the plate 302 has tapered side sections 380, 382 so that the anchor device 300 generally forms a wedge-shape.

An anchor device 400, similar to anchor device 300, is depicted in FIGS. 21-26. The anchor device 400 has a plate 402 with a keyhole opening 410, and a spring retainer 404 for retaining a stud 406 in the opening 410 to secure the anchor device 400 and a seat belt to a vehicle. Like the plate 302 of the anchor device 300, the plate 402 has an upper plate portion 402a and a lower plate portion 402b, parallel and offset from each other and interconnected by a transition portion 402c that extends transverse to the parallel and offset plate portions 402a and 402b. An enlarged portion 412 of the keyhole opening 410 has a D-shape to provide clearance for the stud head 418 when the plate 402 is lifted during installation, similar to opening portion 312 of the previously-described plate 302. The enlarged opening portion 412 extends in the longitudinal direction of the plate through the transition section 402c and into the lower plate portion 402b where opposite shoulders 416 are formed on either side of and extending transversely, and preferably orthogonal to the longitudinal axis 403 of the plate member 402. The D-shaped opening portion 412 provides extra clearance for receipt of the stud head 418 therethrough so that the stud shank 420 can slide into the narrow slot portion 414 of the keyhole opening 410, and the stud head 418 can pass between the opposite side sections 413 and 415 of the transverse plate portion 402c at either side of the opening 412 therein. The shoulder surfaces 416 extend toward each other and to the corner junctures between the D-shaped opening portion 412 and the elongated slot opening portion 414.

The spring retainer 404 serves to retain the stud 406 at the bottom of the slot portion 414 of the anchor device 400. Like the other spring retainers discussed herein, the spring retainer 404 includes an upper edge 404a that is closely adjacent a stop 432 in the form of raised flange 434 formed around an upper seat belt opening 436. The stop flange 434 limits pivoting of the spring retainer 404 during the installation process, as well as during a vehicle collision, for instance. The spring retainer 404 has an upper portion 438 positioned against and extending along surface 440 of the upper plate portion 402a facing the spring retainer 404. The upper portion 438 extends downwardly from the edge 404a thereof to a bridge portion 442 set at a slight inward angle or cant to the upper portion 438 so that it extends transversely thereto and toward the plate surface 440 on the lower plate portion 402b.

The bridge portion 442 is additionally provided with an intermediate arm portion 450 stamped therefrom for providing an early tactile feel of the stud head 418 within the enlarged opening 412, like the spring retainer arm portion 350 of the anchor device 300. The intermediate arm portion 450 has an upper base portion 452 which extends from and joins with the bridge portion 442 in a window opening 453 in the bridge portion 442 over the keyhole opening portion 412 and, more specifically, approximately over or aligned with the transition portion 402c of the plate member 402.

During installation, the anchor device 400 is shifted along the stud axis 406a so that the intermediate arm portion 450, and specifically the upper portion 452 thereof is brought into engagement with the stud head 418 to provide the installer a tactile indication that the stud head 418 is properly aligned with the enlarged opening portion 412 and that plate 402 only needs a slight amount of additional shifting along the axis 406a to position the underside 418a properly with respect to plate surface 440 for shifting therealong. Continued axial shifting of the plate member 402, after the installer has received the tactile feedback, deflects the arm portion 450 outward toward the window opening 453 so that the stud head 418 may engage with both the arm portion 450 and side sections 442a and 442b on either side of the arm portion 450 once the stud heard 418 is in proper position relative to the plate member 402 for sliding therealong, as shown in FIG. 24. The stud shank 420 is then received in the slot opening 414 as the anchor device 400 is shifted upward relative to the stud 406.

For keeping the anchor device 400 in its installed position relative to the stud 406 during impacts with the vehicle that generate forces generally aligned along the axis 406a of the stud 406 or transverse to the plate body 402, such as side impacts with the vehicle depending on the installed orientation of the anchor device 400 in the vehicle, the intermediate arm portion 450 includes a distal clamping end portion 456 for clamping the stud head 418 between the clamping end portion 456 and distal arm portion 470 of the spring retainer member 404. Once the plate member 402 is pulled upward so that the stud 406 is in its installed position at the bottom end of the keyhole slot 414, the clamping end portion 456 exerts a generally axially directed bias force on the underside or lower surface 418a of the stud head 418 while the distal arm portion 470 exerts a generally opposite axially directed bias force on the top or upper surface 418b of the stud head 418, as shown in FIG. 25. Accordingly, even during side impacts, the spring retainer 404 will stay in an interfering position with the stud head 418 so that the anchor device 400 is not allowed to shift downwardly relative to the stud 406. Rather than separating from the stud head 418 due to the axially directed impact forces, the clamping end portion 456 and distal arm portion 470 will generally stay in contact with the stud head 418 thus keeping the anchor device 400 in the installed position thereof. In this regard, the intermediate arm portion 450 serves to retain the stud head 418 at the bottom of the keyhole slot 414 by being in interference therewith in a manner similar to the intermediate arms of the previously-described spring retainers.

Preferably, the clamping end portion 456 is formed at the end of the flat base portion 452 and has a generally U or V-shaped configuration to open back toward the overlying spring retainer bridge portion 442. More specifically, a pair of small, generally U or V-shaped prong portions 458 are preferably formed at the end of the flat base portion 452 of the spring retainer intermediate arm 450 to extend into the slot opening 414, as shown in FIG. 23. The prongs 458 each have a cam portion 460 that extends transversely to the base portion 452 of the intermediate arm 450 at juncture 457 toward the plate 402 and downwardly. The configuration and orientation of the cam portions 460 are such that when the anchor device 400 is pulled upward with the stud head 418 in the FIG. 24 position, the prongs 458 will be cammingly engaged at their cam portions 460 by the stud head 418 to be lifted away from the plate member 402.

At 461, the prongs 458 curve back away from the plate member 402 to their free ends 462. Prior to stud head engagement, the distance between the prong free ends 462 and the arm portion 470 in a generally orthogonal direction to the plate axis 403 is less than the axial thickness of the stud head 418, as can be seen in FIGS. 23 and 24. However, the larger arm portion 470 exerts a greater axially directed bias force than do the relatively smaller prongs 458. Accordingly, once the anchor device 400 is pulled up a sufficient amount so that the stud head 418 clears the prong free ends 462, rather than residing adjacent the side of the stud head 418 the large bias force exerted by the arm portion 470 will cause the prongs 458 to snap under the stud head 418 to engage the underside 418a thereof, as shown in FIG. 25.

The spring retainer 404 further includes the distal arm portion 470 for anti-rattle purposes. Once the stud head 418 passes by the intermediate arm portion 450, the distal arm portion 470 comes into contact with the top surface 418b of the stud head 418 and presses the stud head bottom surface 418a towards and against the lower plate section 402b to minimize relative axial movement therebetween.

FIGS. 27-31 depict a further form of an anchor device 500 for securing a seat belt with a vehicle. The anchor device 500 includes a plate 502 and a spring retainer 504, each including features of the previously described anchor devices, including an upper seat belt opening 505 for receiving a seat belt. The plate 502 includes a keyhole opening 508 for receiving a stud 506, while the spring retainer 504 serves to keep the device 500 at its installed position relative to the stud 506 with the stud 506 at the bottom of the keyhole opening 508.

The plate 502 has an upper plate portion 502a and a lower plate portion 502b, the two portions joined by a transition portion 502c transversely oriented to the upper and lower plate portions 502a and 502b. Each of the upper and lower plate portions 502a, 502b is generally planar, and they are offset by the plate portion 502c, such that they generally lie in parallel planes. The keyhole opening 508 includes an enlarged opening portion 510 including a D-shaped opening 512 formed in the upper plate portion 502a and extending through the transition and lower plate portions 502b, 502c similar to the previously-described keyholes 310 and 410. Accordingly, shoulders 514 are defined by the enlarged opening 510 on the lower plate portion 502b, as can be seen in FIGS. 27 and 28. The keyhole opening 508 also includes an elongated slot portion 516 formed in the lower plate portion 502b and extending along the central, longitudinal axis 503 of the plate 502 and anchor device 500. The shoulder surfaces 514 extend inward orthogonal to the plate axis 503 and meet with the upper end of the narrow slot portion 516 at corners 520.

As noted above, the upper plate section 502a is offset from the lower plate section 502b, preferably by an amount generally corresponding to the axial thickness of the stud head 518 which, in turn, can be approximately the same as the thickness of the plate 502 designated by reference number 522 in FIG. 29. As can be seen, the plate 502 can have a constant thickness so that each section 502a-c thereof is of the same thickness. Further, the upper plate section 502a has main surfaces 530 and 531, and the lower plate section 502b has main surfaces 532 and 533 (FIG. 27). The upper plate section 502a is offset with respect to the lower plate section 502b so that the upper section surface 531 is approximately co-planar with the lower section surface 532.

Figure 30:
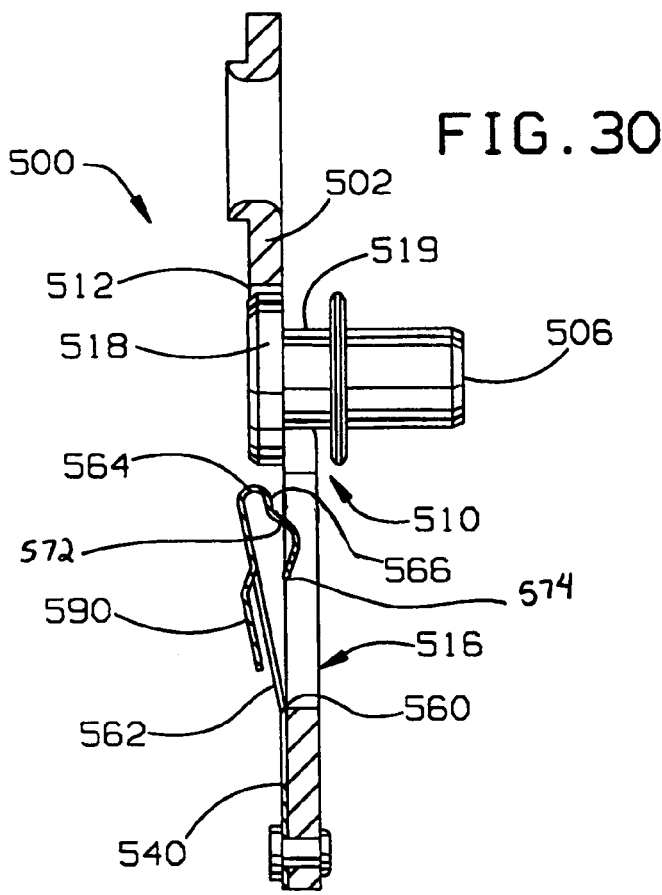

For installation, the anchor device 500 and stud 506 are properly aligned, and the plate 502 is shifted toward the stud 506 so that the head 518 is received in the D-shaped opening 512, as shown in FIG. 30. The stud 506 has a shank 519 with a diameter sized to allow the shank 519 to be received by the slot portion 516. The anchor device 500 is then lifted upwardly so that the shank 519 moves along the slot portion 516 until the stud 506 reaches its installed position at the bottom of the slot 516.

The spring retainer 504 is secured to the plate 502. As can be seen in FIG. 29, the spring retainer 504 has a lower or distal connection end portion 540 that is generally flat and secured to extend flush against the plate lower portion surface 532. A single fastener such as a rivet 542 secures the spring retainer 504 to the plate 502. Accordingly, unlike the previously-described spring retainer, the spring retainer 504 extends upwardly from its fastened location adjacent the lower end of the plate member 502.

Figure 32:
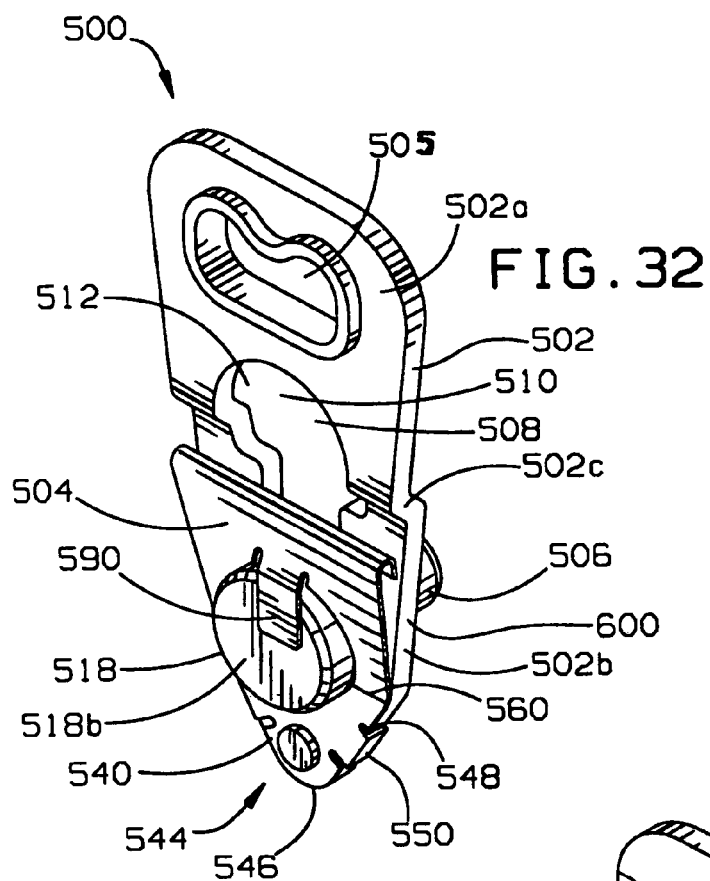

The plate 502 and spring retainer 504 are provided with stop structure in the form of cooperating interfering surfaces to restrict relative pivoting therebetween particularly during installation. The plate 502 has a leading or distal end 544 with a rounded front edge surface 546 spanning between generally straight edge surface sections 548. The straight edge sections 548 taper away from each other so that the lower plate section 502b has a wedge shape, as can be seen in FIGS. 27, 28 and 32. The spring retainer 504 includes stops in the form of bent tab portions 550 that are integral with and extend generally orthogonal to the spring retainer end portion 540 adjacent and along the plate edge surfaces 548.

To secure the spring retainer 504 with the plate 502, the spring retainer 504 is positioned with the tab portions 550 against the straight edge sections 548, whereupon the rivet 542 is applied to connect the spring lower end portion 540 to the plate lower section 502b, along surface 532 thereof. In this regard, the tab portions 550 are prebent. Alternatively, the spring retainer 504 may be placed on the lower plate section 502b with the tabs 550 extending in the same plane as the securing portion 540. The spring retainer 504 may then be mechanically joined to the plate 502 by the rivet 542, and the tab portions 550 may be deformed or bent around the edge surface sections 548 to ensure that the tabs 550 are positioned close against the edge surfaces 548. In this manner, pivoting of the spring retainer 504 relative to the plate 502 is resisted, particularly during installation or even under a high-energy impact experienced by the vehicle.

The spring retainer 504 overlies the keyhole opening 508, particularly over the slot portion 516 thereof, and is resiliently deflected away from the plate 502 to permit receipt of the stud shank 519 in the keyhole slot 516. The spring retainer 504 includes a bend 560 formed between a bridge portion 562 and the end portion 540 (FIG. 29). The bend 560 is such that the bridge portion 562 extends upwardly and away from the lower plate portion surface 532 at an oblique angle thereto. The spring retainer 504 may resiliently deflect about the bend 560 during installation as described hereinafter. A U-shaped or curled portion 564 of the spring retainer 504 is formed at the upper end of the bridge portion 562. A ramp section 566 of the curled portion 564 extends obliquely back down and toward the plate 502 over the keyhole slot portion 516. At the end of the ramp section 566, a clamping end portion 568 extends into the slot opening 516 similar in structure and formation to clamping end portion 456 of the spring retainer member 404, as will be described further hereinafter.

In the anchor device 500, the spring retainer 504 does not interfere with receipt of the stud head 518 in the enlarged opening 510. The bridge portion 562 extends upwardly, and the curled portion 564 is at a position short of or below the transition portion 502c. As can be seen in FIG. 28, the curl 564 is positioned toward the upper end of the slot opening 516 adjacent the shoulders 514 of the D-opening portion 512.

Upward lifting of the anchor device 500 brings the stud head 518 into contact with the curled portion 564. Continued upward lifting will then generate a camming action between the stud head 518 and the curled portion 564 including the ramp section 566 thereof to deflect the curl 564 and, hence, the bridge portion 562 outward away from the plate 502 about the bend 560 until the stud head 518 clears the end of the clamping end portions 568.

Figure 31:
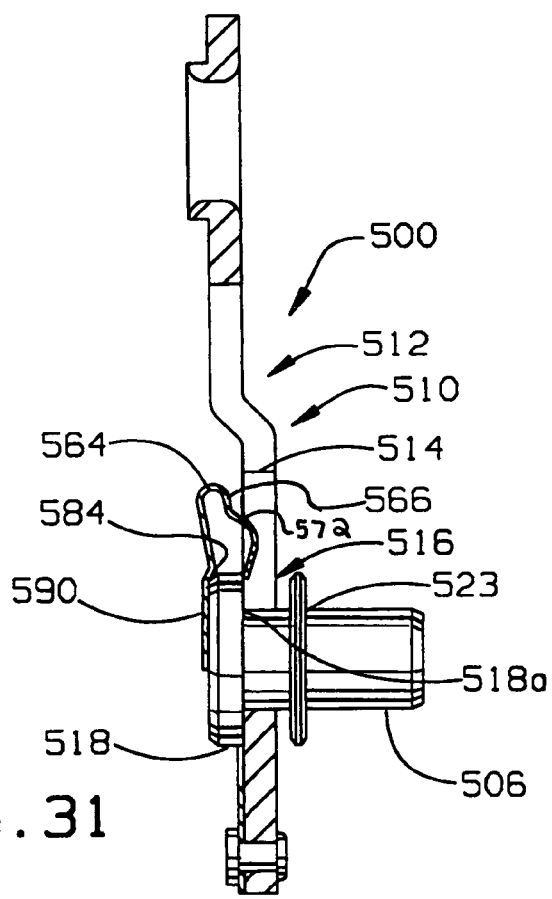
Figure 33:
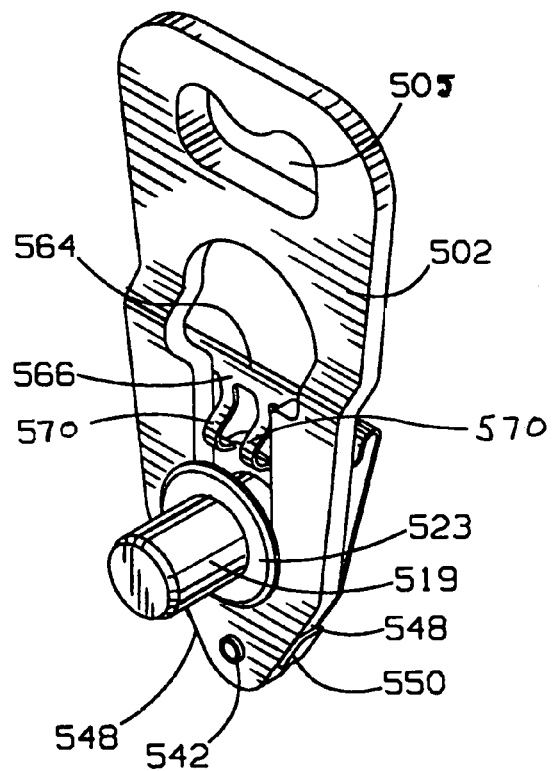

The clamping end portion 568 preferably includes a pair of small, generally U or V-shaped prong portions 570 that open back toward the bridge portion 562 of the spring retainer 504. The prongs 570 each have an upper cam portion 572 extending transversely from the ramp section 566 toward the plate 502 and downward so that lifting of the plate 502 causes the stud head 518 to also cam against the prong cam portions 572 for being shifted out of the slot opening 516 and away from the plate 502. Prior to stud head engagement, the distance between the ends of the prongs 570 and the bridge portion 562 in a direction generally orthogonal to the plate axis 503 and extending away from the plate 502 is less than the axial thickness of the stud head 518. Once the stud head 518 has passed by the prongs 570, the bridge portion 562 resiliently returns inwardly toward the plate 502. The larger bridge portion 562 exerts a greater bias force on the stud head 518 than do the smaller prongs 570 so that once the stud head 518 clears the free ends 574, the larger bias force directed toward the plate 502 will cause the prongs 570 to snap under the stud head 518 with the prong ends 574 engaged on the underside 518a thereof, as shown in FIGS. 31 and 33. In this manner, the stud head 518 is resiliently clamped between spring retainer portions 570 and 590. Accordingly, like spring retainer 404, the spring retainer 504 provides advantages when impact forces are directed generally orthogonal to the plate axis 503 along the stud axis 521, such as during side impacts, for keeping the anchor device 500 secured to the stud 506.

As illustrated, the bridge portion 562 can include a central window opening 580 forming an inner edge 582, generally circular with a diameter closely approximating the diameter of the stud head 518. Shortly after or concurrent with the stud head 518 passing the arms 568, the stud head 518 is aligned with the window 580. As noted above, the bend 560 between the spring end portion 540 and the bridge portion 562 permits resilient outward deflection of the bridge portion 562. The resilience of the bridge portion 562 once the stud head 518 passes the prongs 570 allows the bridge portion 562 to shift back inwardly toward the plate 502 so that the stud head 518 is received within the window 580. Since the bridge portion 562 extends upwardly at an oblique angle to the plate member 502, the inner circular edge 582 of the opening 580 in which the stud head 518 is received extends at a slant along the axial thickness thereof between the stud head bottom and top surfaces 518a and 518b, as shown in FIG. 32.

With the edge 582 of the opening 580 surrounding the stud head 518, movement of the stud head 518 relative to the anchor device 500 is restricted in each direction keeping the anchor device 500 in its installed position relative to the mounting stud 506. In particular, movement of the stud head 518 back upwardly along the slot opening 516 is restricted by the stud head 518 contacting a top portion 584 of the inner edge 582 which is interference therewith.

As previously mentioned, with the anchor device 500 in its installed position the stud head 518 is resiliently clamped between the spring portions 570 and 590. More specifically, the spring portion 590 can have a tab-shaped configuration extending radially inward from the edge 582 of the opening 580 toward the center thereof and bent to extend slightly above the plane of the bridge portion 562. Accordingly, when the anchor device 500 is in its installed position with the stud head 518 received in the spring retainer opening 580, the tab portion 590 will be resiliently engaged with the stud head top surface 518b to exert a generally axially directed bias force on the stud head 518 generally opposite to the bias force exerted by the resilient prongs 570 resiliently engaged on the underside 518a of the stud head 518. In this manner, should there be a vehicle impact generating significant forces on the anchor device 500 that are generally aligned along the stud axis 521, the spring retainer 504 will stay in interfering position with the stud head 518 so that the anchor device 500 is not allowed to shift downwardly relative to the stud 506.

The tab portion 590 of the spring retainer 504 also minimizes rattling between the anchor device 500 and stud 506 such as between the plate 502 and an intermediate collar 507 formed along the stud shank 519. The bias force of the tab portion 590 on the stud head 518 keeps the stud head bottom surface 518a tightly engaged against the plate surface 532 on either side of the slot opening 516 to minimize relative movement therebetween along the stud axis 521.

The overall geometry of the anchor device 500 facilitates its insertion within vehicle trim or the like. The plate 502 has an overall wedge shape, including the leading end 544 with and the rounded front edge 546 and the tapering, straight edge sections 548 forming a wedge shape. Toward this end, the plate 502 has opposite sides 600 joined with respective edge sections 548, where the sides 600 are also tapered, although not as great as the taper provided to the side edges 548, to provide the plate 502 with a wedge shape along its entire length. Also, the spring retainer 504 is smaller than the previously-described spring retainers in that it is shorter as it only extends along the keyhole slot 516 and not at all over the enlarged opening portion 510. Further, the profile of the spring retainer 504 is very low as it only extends beyond the surface 530 of the upper plate section 502a by a very slight amount. Additionally, as the spring retainer 504 has its leading end portion 540 during insertion secured to the lower end of the plate 502, this further reduces the possibility that a portion of the spring retainer may catch on the interior of the upholstery or trim during installation.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed:

1. A seat belt anchor device for anchoring a seat belt to a stud having a shank and an enlarged head, the seat belt anchor device comprising:
   a plate member having a body thereof;
   a seat belt opening in the plate body sized to receive a seat belt extending therethrough;
   a keyhole opening in the plate body having an enlarged portion for fitting the stud head therethrough and a narrower portion for sliding the plate body to an installed position relative to the stud;
   a spring retainer arranged to extend in overlying relation to the keyhole opening and configured to keep the plate body and stud in the installed position thereof;

an end portion of the spring retainer connected to the plate body; and a stop that limits pivoting of the end portion to keep the spring retainer extending in overlying relation to the keyhole opening, wherein the spring retainer has a portion of an indicator portion that extends over the keyhole opening enlarged portion spaced by a predetermined amount from the plate body that is less than a thickness of the stud head.

2. The seat belt anchor device of claim 1 wherein the stop comprises interfering portions of the spring retainer and the plate member body.

3. The seat belt anchor device of claim 1 wherein the stop comprises a flange that extends about the seat belt opening with the spring retainer end portion connected to the body adjacent to the seat belt opening.

4. The seat belt anchor device of claim 1 including a single fastener that connects the spring retainer end portion to the plate body.

5. The seat belt anchor device of claim 4 wherein the single fastener is a rivet and the stop is integral with the plate body so that the anchor device has only three distinct components with the components being the plate member, the spring retainer and the rivet.

6. The seat belt anchor device of claim 1 wherein the plate body has an elongate configuration with opposite sides extending lengthwise along the plate body between opposite ends thereof, the seat belt opening extends transversely between the plate body sides adjacent one end of the plate body, the keyhole opening has the enlarged portion adjacent the seat belt opening, and a connection area between the keyhole opening and the seat belt opening that is sized sufficiently large to allow the spring retainer end portion to be connected to the plate body in the connection area.

7. The seat belt anchor device of claim 6 wherein the plate body has a central longitudinal axis, and a single fastener connecting the spring retainer end portion to the plate body in the connection area aligned along the central longitudinal axis.

8. The seat belt anchor device of claim 7 wherein the single fastener is a rivet about which pivoting of the spring retainer is permitted and the stop extends transversely along the belt opening adjacent the connection area to limit spring retainer pivoting.

9. The seat belt anchor device of claim 1 wherein the indicator portion extends generally parallel to the plate body and has a window opening formed therein so that sections of the indicator portion extend entirely about the window opening.

10. A seat belt anchor device for anchoring a seat belt to a stud having a shank and an enlarged head, the seat belt anchor device comprising:

a plate member having a body thereof;

a keyhole opening having an enlarged portion sized for receiving the stud head therethrough and a narrower portion sized for receiving the stud shank therein for positioning the anchor device in an installed position relative to the stud;

a spring retainer arranged to extend in overlying relation to the keyhole opening and configured to maintain the plate body and stud in the installed position thereof; and an indicator portion of the spring retainer for engaging the stud head when the stud head is generally aligned with the enlarged portion of the keyhole opening and prior to full receipt of the stud head therethrough, wherein a portion of the indicator portion extends over the keyhole opening enlarged portion spaced by a predetermined amount from the plate body that is less than a thickness of the stud head.

11. The seat belt anchor device of claim 10 wherein the indicator portion is raised from and extends either parallel to or toward the plate body at least partially overlying the enlarged opening so as to be aligned with the stud head as the plate member is being advanced over the stud so that the stud head is received in the enlarged opening.

* * * * *